Figure 1:
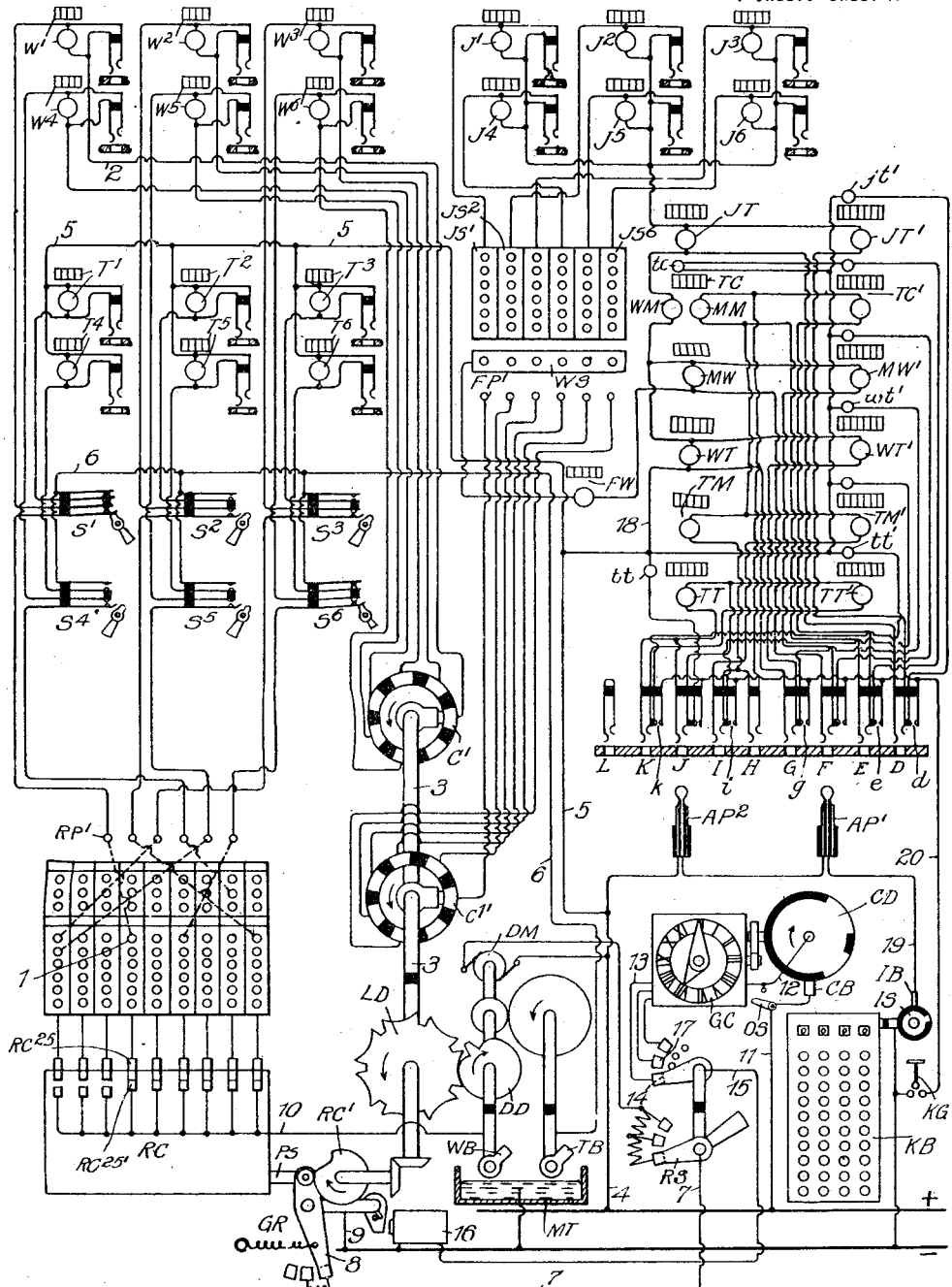

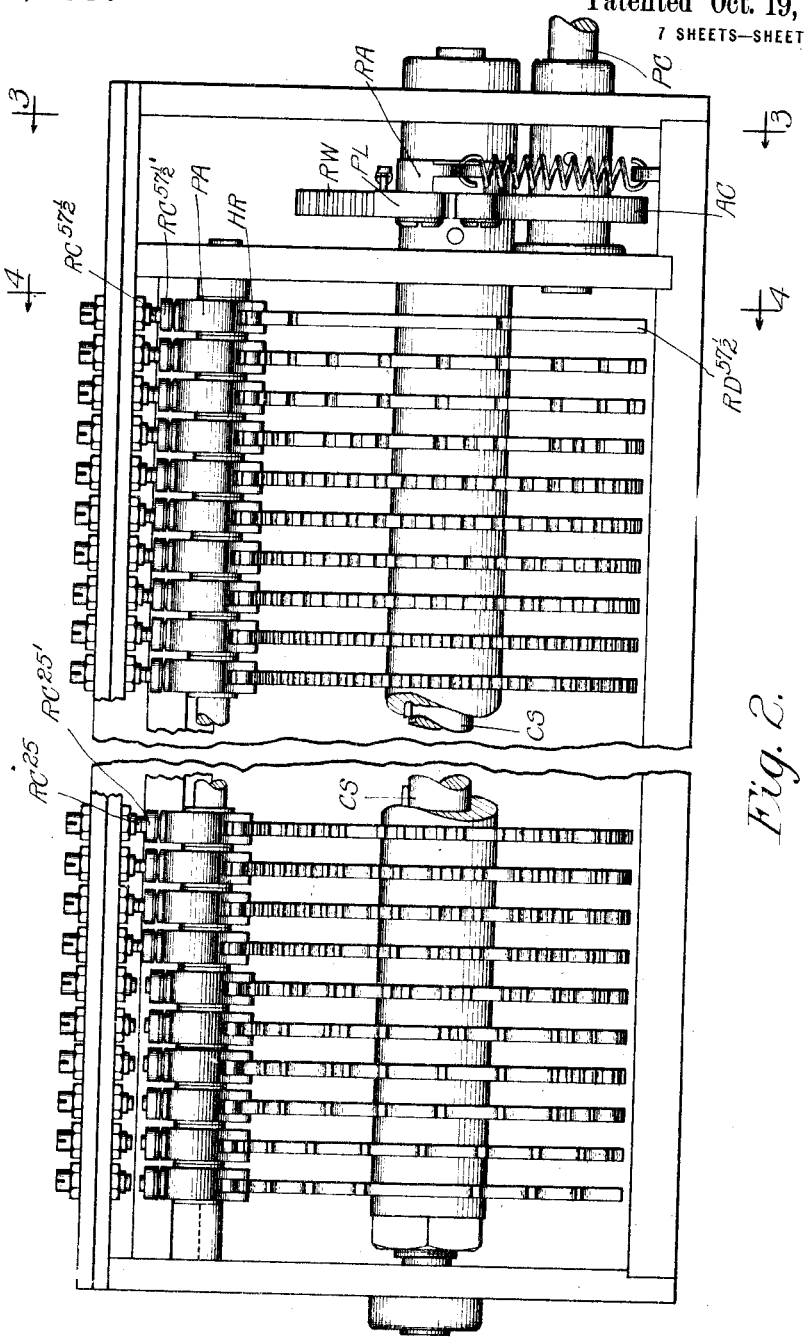

F. O. HEUSER.
ACCOUNTING SYSTEM.
APPLICATION FILED MAY 13, 1909. RENEWED MAR. 12, 1915.

1,157,625.

Patented Oct. 19, 1915.
7 SHEETS—SHEET 3.

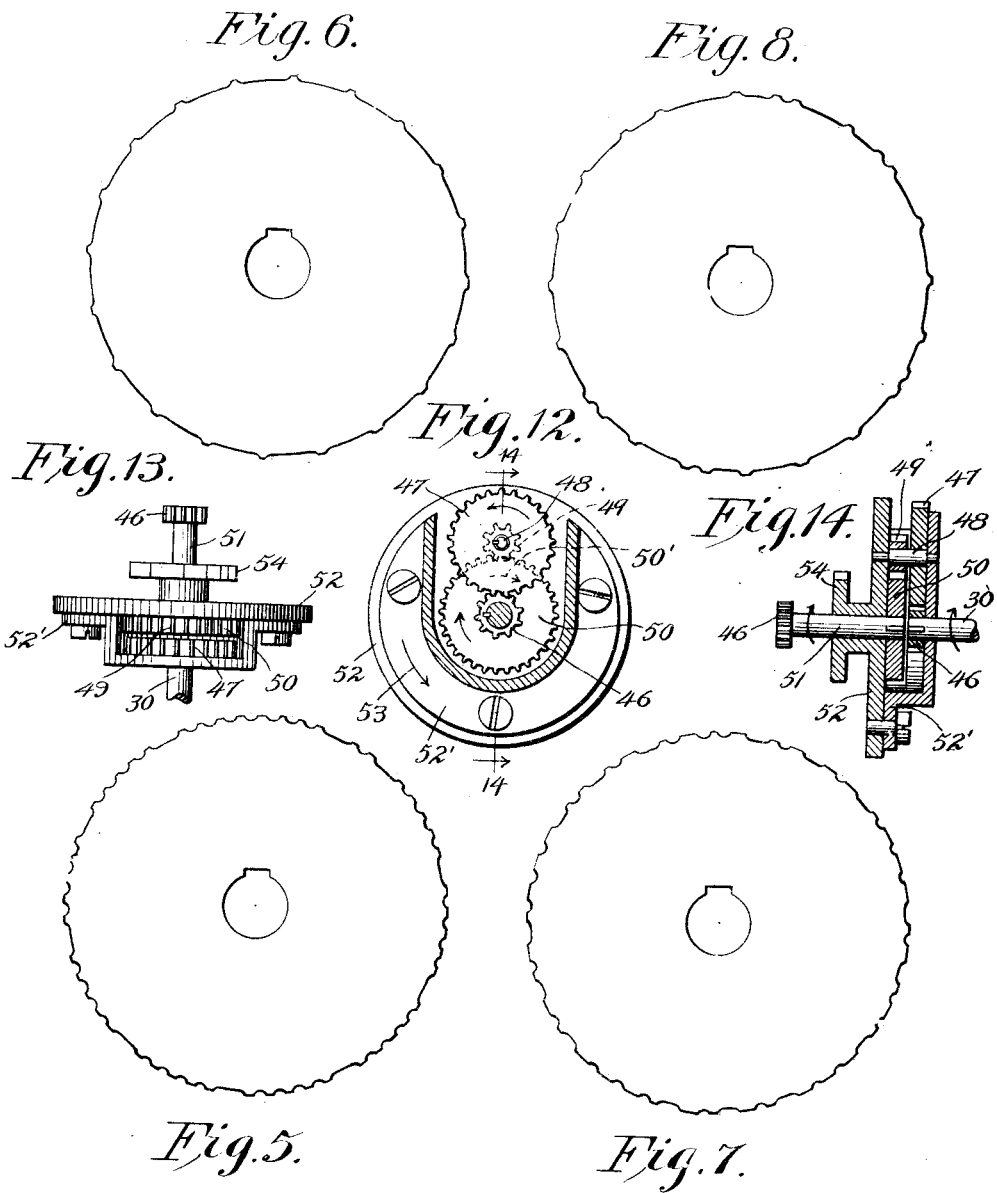

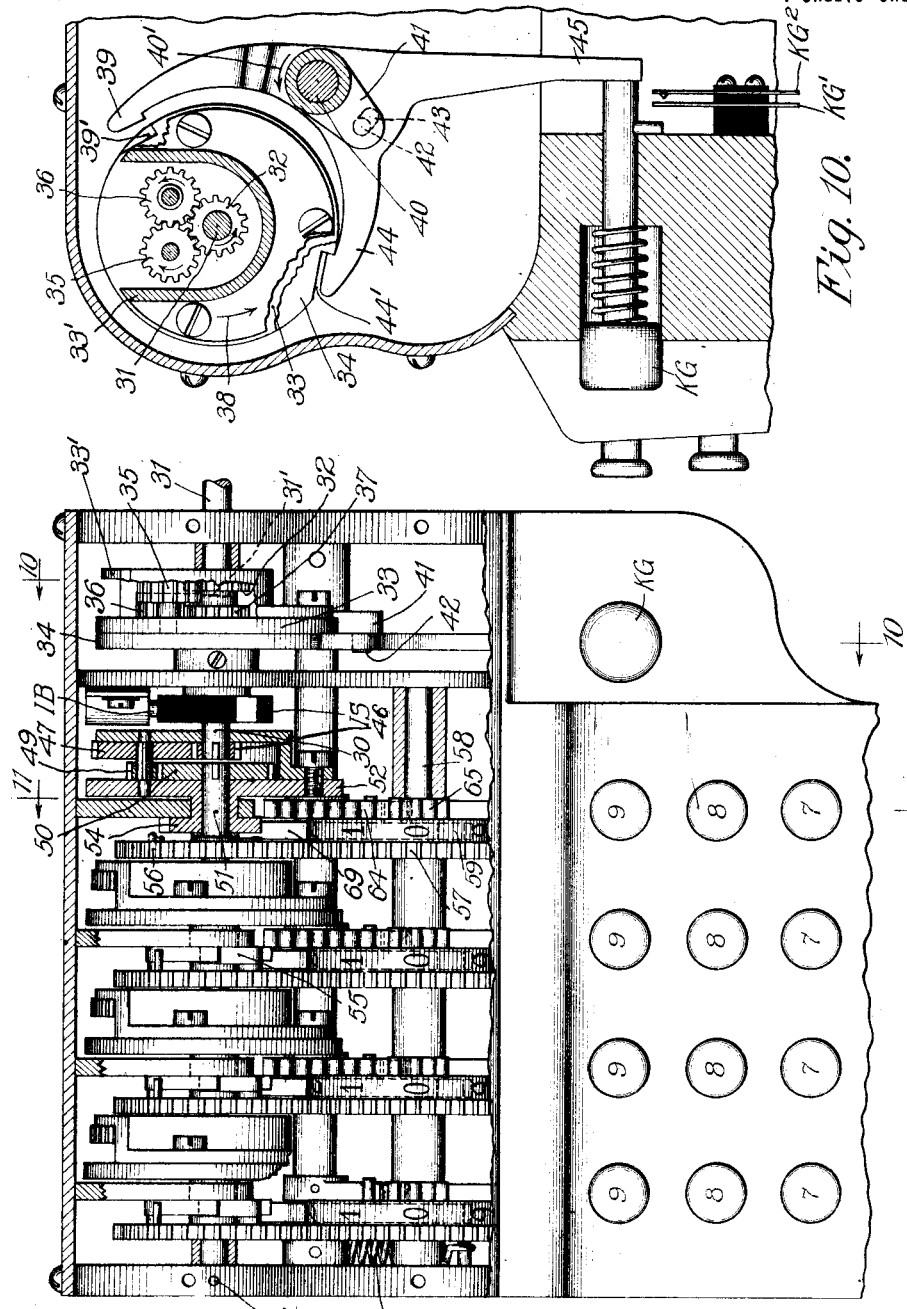

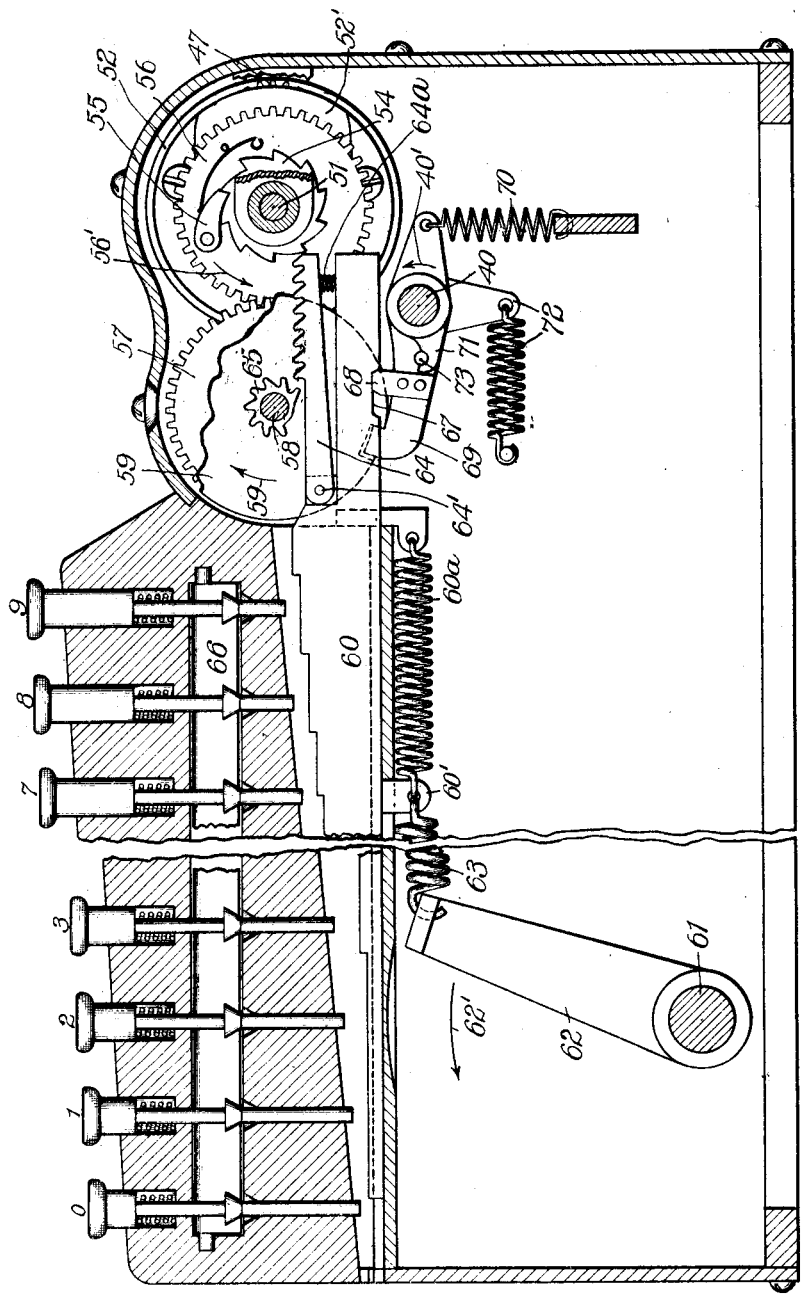

F. O. HEUSER.
ACCOUNTING SYSTEM.
APPLICATION FILED MAY 13, 1909. RENEWED MAR. 12, 1915.
1,157,625.
Patented Oct. 19, 1915.
7 SHEETS—SHEET 7.
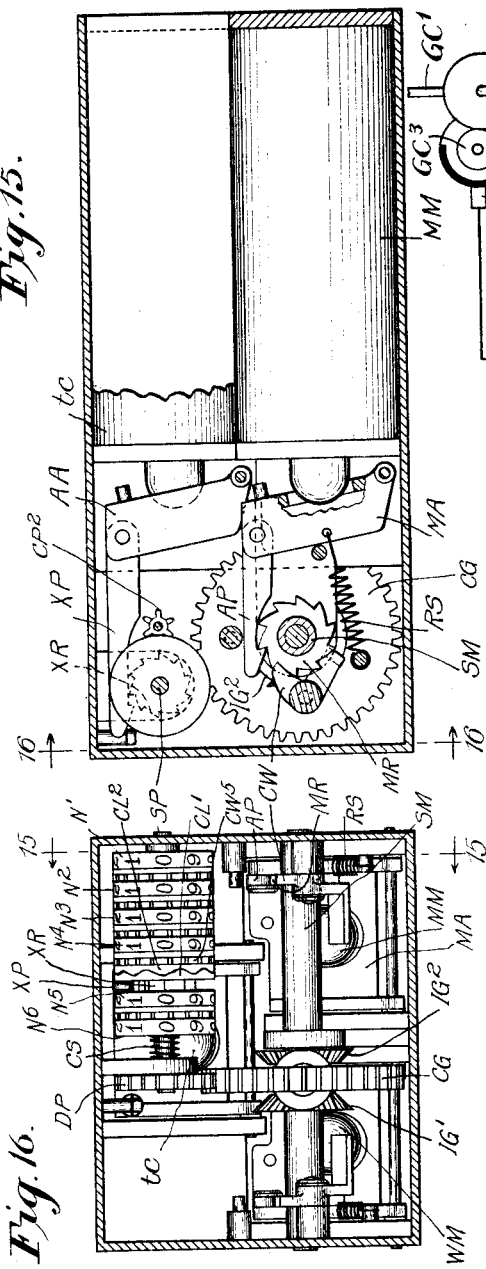
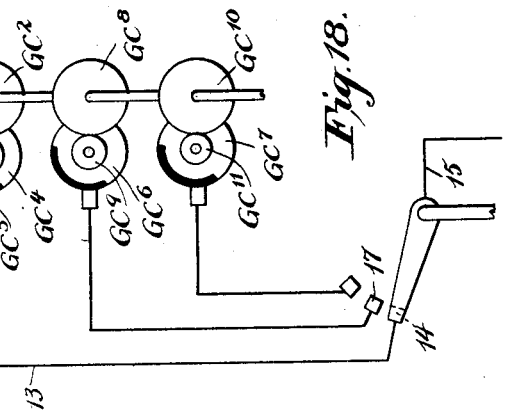
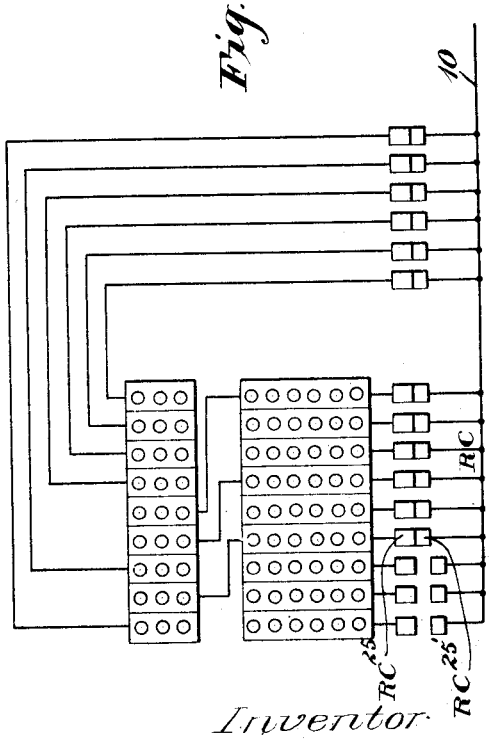
Witnesses:
Leonard W. Novander
George C. Higham
Inventor
Frederick O. Heuser
By Brown & Williams
Attorneys

UNITED STATES PATENT OFFICE.

FREDERICK O. HEUSER, OF CHICAGO, ILLINOIS, ASSIGNOR, BY MESNE ASSIGNMENTS, TO WILLIAM R. HEATH, OF BUFFALO, NEW YORK.

ACCOUNTING SYSTEM.

1,157,625. Specification of Letters Patent. Patented Oct. 19, 1915.

Application filed May 13, 1909, Serial No. 495,717. Renewed March 12, 1915. Serial No. 13,972.

*To all whom it may concern:*

Be it known that I, FREDERICK O. HEUSER, a citizen of the United States, residing at Chicago, in the county of Cook and State of Illinois, have invented a certain new and Improved Accounting System, of which the following is a full, clear, concise, and exact description, reference being had to the accompanying drawings, forming a part of this specification.

My invention relates to accounting systems, and while many of the features are applicable for various purposes in systems of various kinds, they are peculiarly applicable to a system for time, wage and job-cost accounting and to a system of this kind where the lapsation of time is the factor which controls and determines the rate or amount of actuation.

Otherwise stated, my present invention is a further development of systems described and claimed in the applications of Charles H. Tallmadge, Serial No. 408,569, filed December 30, 1907, and Serial No. 423,284, filed March 26, 1908, Arthur F. Poole, Serial No. 437,876, filed June 11, 1908, and Serial No. 437,877, filed June 11, 1908, William J. Crumpton, Serial No. 437,805, filed June 11, 1908, and Lynn W. Williams, Serial No. 423,285, filed March 26, 1908. These applications provide, among other things, in one form or another, means for concurrently showing certain totals, as, for example, the total of the wages of a number of workmen, the wages of each workman being indicated as earned, and the total being shown concurrently therewith. Two broadly distinguishable methods of effecting these totalizations have been shown and described in these previous applications. In one, the totalization is effected by purely mechanical means, as, for example, a series or train of differential gears. In the other, the totalization is effected electrically, by placing in a common wire of a branched circuit a totalizing register, there being an individual register in each of the branches of the circuit, whereby impulses may be sent in succession through the several branches, and in each instance through the common wire, to actuate the individual registers severally and to actuate the totalizing register each time that any of the individual registers is actuated. The result is that the actuations of the totalizing register are equal to the total actuations of the individual registers, the dial of the totalizing register showing a total equal to the sum of the readings of the individual registers. While the mechanical means for effecting the totalizations is somewhat complicated and expensive to construct, and requires also some little power for its operation, it permits the simultaneous actuation of any number of the individual registers at all sorts of rates, without introducing any difficulties as to the totalization. On the other hand, the electrical means for effecting the totalization is simple in construction, and requires but little power for its operation; but it is impracticable simultaneously to actuate any considerable number of individual registers without greatly complicating the means for effecting the totalizations. It is desirable, therefore, to actuate the individual registers in succession, one after another and no two at the same time. If, now, a large number of workmen, with widely variant rates of wages, are to be handled by a machine operating on the electrical plan for totalization, it becomes a considerable problem to effect the successive operation of a large number of individual wage registers at rates such that the proper showing of wages for each workman will be secured, and such also that the proper totalizations will be effected. It is one of the important objects of my present invention to solve this problem in a practical and efficient manner.

To this end, my present invention provides, in the best form now known to me, a switching mechanism which cyclically closes in succession, one after another, the circuits of all of the individual registers, the predetermined circuit connections being such as to include in each instance the actuating mechanism of the proper totalizing register. I provide also a make and break switch, which controls the actual flow of current through the circuits successively closed by the selector switch mechanism. While the selector switch runs at a uniform rate, and therefore closes all of the individual circuits the same number of times per period, the make and break switch does not cause a current impulse actually to flow upon each such closure of every circuit. On the contrary, the make and break switch is operated to cause the flow of current impulses through any individual circuit at a rate proportionate to the rate of wages, for example, of the workman assigned to that circuit and the individual register included therein. I have found it desirable to cause an impulse to flow through an individual register whenever the workman assigned to that register has earned one cent in wages. The result has been a plan of operation which I have come to designate as the "cent-per-impulse" scheme. The details of the mechanism for causing this cent-per-impulse operation will be more clearly understood from the detailed description which is to follow. In order to take care of half-cent rates of wages, the selector switch may be operated on a two-hour basis; other fractional rates may, in like manner, be taken care of by actuating the selector switch on other bases or periods of time within which a cycle is completed.

Among the advantages of the system herein disclosed may be mentioned the fact that the actual flow of current is, in every instance, commenced or stopped by a single switch located at a single place. It is therefore necessary to provide only a single switching device, capable of withstanding the sparking or arcing which is inherent in the operation of electromagnetic mechanism in circuits of this kind. This advantage is closely connected with another, namely, the fact that the switching members of the distributing commutator or selector need not be shifted while current is flowing therethrough.

My invention provides a very flexible means whereby any workman's rate of wages, as shown by his wage register, may readily by changed by altering the connection of the individual circuit with the rate controlling mechanism. The circuits of the rate controlling mechanism are made to terminate in spring jacks, or switch contacts, there being a group of jacks or contacts individual to each rate of wages. It is, therefore, only necessary to connect the terminal of the workman's individual circuit with the proper spring jack or contact, in order that his wage register will be actuated at a rate corresponding with his rate of wages. Not only do I provide a series of jacks for the regular rates, but. in association with each set of regular time jacks or contacts, I provide a set of overtime jacks, the ratio being one to one and a quarter, or one to one and a half, in accordance with the practice of the parties using the system. This arrangement of the jacks makes it a simple matter to change a workman from the regular rate to the overtime rate, or vice versa, and to insure the correctness of the rates with which the registers will be actuated, under all circumstances.

My invention provides also an improved means for running the impulse controlling mechanism at a speed one-fourth or one-half higher than the regular speed, in order that all of the registers will be actuated at the increased rate if at any time such more rapid actuation is required throughout the system.

My invention provides a novel and effective means for governing the rate of operation of the impulse controlling mechanism by means of a well regulated clock.

Another feature of improvement incorporated into my present system is a means for starting and stopping the operation of the impulse controlling mechanism at predetermined hours of the day; for example, starting the mechanism at seven o'clock in the morning and stopping it at twelve, noon, this being done automatically, without care on the part of an attendant.

In accordance with my present invention, the workmen's time registers are actuated simultaneously, the totalization of the time being effected by the operation of a keyboard and suitable totalizing mechanisms in association therewith. This or similar keyboard mechanism may, in like manner, be utilized in effecting other totalizations, as, for example, the total of the wages, if desired. One of the novel features associated with the keyboard and its use is the means and method of advancing the individual registers to their zero position when they are to be re-set, this forward re-setting of the registers being substituted for the backward or return movement of the registers to the zero position as contemplated in some of the earlier systems. This forward re-setting is accomplished by means of the keyboard mechanism, without the requirement for circuit controlling switches associated with the registers themselves.

When the individual registers are set forward to zero, their readings may, in accordance with my invention, be totalized by transferring to a total register the complements of the readings of the individual registers, the proper order wheel of the totalizing register being counter-actuated one step or unit for each individual register which is cleared. In this conjunction, one of the useful features of my invention is the association with each of the individual registers of a spring jack or other set of switch contacts, whereby the terminals of a re-setting circuit or impulse mechanism may be connected directly with any individual register, to re-set it to its zero position.

Another important feature of improvement of my present invention is the method and means for transferring between various totalizing registers, for the purpose of actuating the registers in accordance with the accounting results which it is desired to secure. The summations and subtractions as between the various registers are effected by the use of a keyboard controller, and plug and jack or other switching mechanism for establishing connections with the required register actuating mechanisms. The keyboard mechanism serves also an important function in permitting other charges, such as charges or deductions for material, to be added or subtracted from the readings of the job-cost registers. One of the more important mechanical combinations incorporated into the keyboard controlling mechanism is a device which I have called a multi-ratio differential gear. One of the many uses to which this novel gear may be put will be more fully understood from the detailed description which is to follow.

So, generally, all of the features above referred to and some others not mentioned will be more fully understood by reference to the accompanying drawings, in which —

Figure 4:
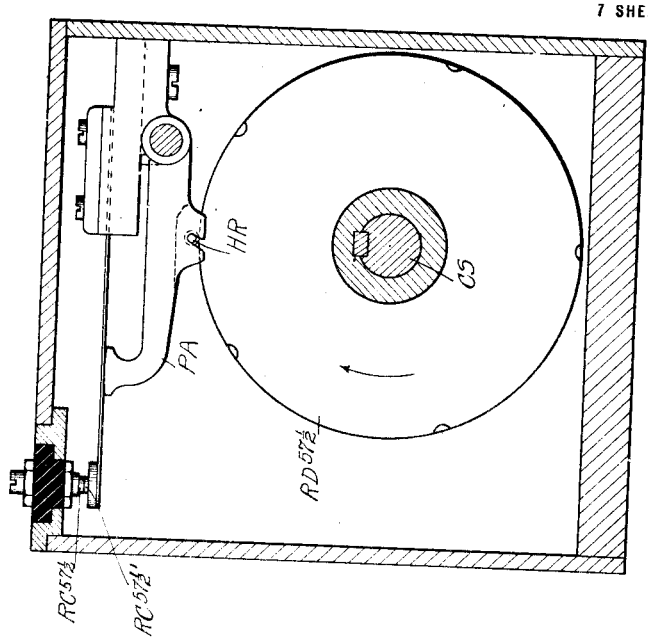
Figure 3:
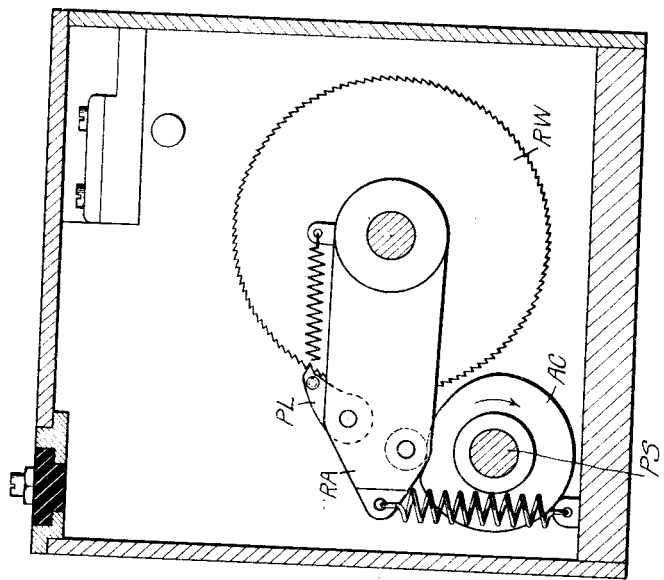

Figure 1 is a diagrammatic representation of the circuits and apparatus arranged in accordance with the system of my invention; Fig. 2 is a front elevation of the rate-controlling switch; Fig. 3 is a cross-sectional view of the rate-controlling switch taken on line 3, 3 of Fig. 2; Fig. 4 is a cross-sectional view of the rate-controlling switch taken on line 4, 4 of Fig. 2; Figs. 5, 6, 7 and 8 illustrate in side elevation sample controller disks taken from the rate-controlling switch mechanism; Fig. 9 is a plan view with certain parts in cross section of the keyboard impulse controller; Fig. 10 is a cross-sectional view of the keyboard impulse controller, taken on line 10, 10 of Fig. 9; Fig. 11 is a more complete cross sectional view of the keyboard rate controller, this view being taken on line 11, 11 of Fig. 9; Figs. 12 and 13 are respectively front and side views of the multi-ratio differential gear; Fig. 14 is a cross-sectional view of this gear, taken on line 14, 14 of Fig. 12; Fig. 15 is a view largely in side elevation of a totalizing register equipped with a compensator to permit the transfer of complemental readings, and Fig. 16 is a view largely in front elevation of the same register and its actuating mechanism. In so far as these views are cross-sectional, they are taken respectively on line 15, 15 of Fig. 16, and line 16, 16 of Fig. 15. Fig. 17 shows in diagrammatic circuit arrangement the connections of the rate switchboard, and shows the connection of the regular rate jacks and the over-time jacks with the circuit-closing devices adapted to control the circuits through such jacks. Fig. 18 shows in diagrammatic view switching mechanism employed in the controlling clock for governing the motor employed to drive the impulse-sending mechanism.

I shall take up first the detailed description of the circuits and mechanisms for actuating the individual registers assigned to the various workmen. Before proceeding to the details, it may be well to explain generally that a time register and a wage register are assigned to each workman. Each workman's time and wage register are connected in circuits controlled by a manually operable switch, this switch being within the control of the workman, whereby he may start and stop the operation of his registers in accordance with the hours during which he is at work. A time-keeper or superintendent has control of the terminals of the workmen's individual circuits, and each of these he may connect with a source of current impulses of the proper rate. The foreman, whose business it is to assign the individual workmen to the jobs in process, has control of a switchboard comprising spring jacks, which form the terminals of the job register circuits, and plugs, which form the terminals of the individual workmen's circuits. There is also a strip of spring jacks which forms the terminal of the circuit of a waste wage register, and the foreman must complete each individual circuit either through some job register or through the waste wage register, in order that the individual time and wage registers will be actuated to credit the workmen with the wages to which they are entitled. I shall not attempt to describe the totalizing circuits and mechanisms, until I have described a little more in detail the individual circuits and registers, and the means for actuating them.

Referring more particularly to Fig. 1, the workmen's time registers are diagrammatically indicated at $T^1$, $T^2$ ... $T^6$. The corresponding individual wage registers are indicated respectively at $W^1$, $W^2$ ... $W^6$. Each of these registers comprises, in the well-known way, a set of numeral wheels and an electromagnetic pawl and ratchet mechanism for actuating the numeral wheels. Associated with each time and wage register is a workman's switch, the switches in the drawing being indicated at $S^1$, $S^2$ ... $S^6$. These are the switches opened and closed by the individual workmen in controlling the operation of the individual time and wage registers. Following but one of the circuits, as an illustration, it is to be seen that the rate plug $RP^1$ may be inserted in the spring jack 1, as indicated in dotted lines, and assuming, for the moment, that this spring jack connects with a source of current impulses, a circuit may be traced from the plug $RP^1$ through the two lower contacts of the switch $S^1$, thence through the electromagnetic actuating mechanism of the individual register $W^1$, thence through the wire 2 which leads to the segment $C^1$, of the selector switch. From this sector, the circuit may be traced through the associated brush in the metal shaft 3, thence to the brush which is in connection with the sector C¹ of the other commutator of the pair which forms the selector switch. From this point, circuit may be traced to the plug FP¹ of the foreman's switchboard. For the present, it may be taken for granted that this plug may be inserted in a spring jack which completes and closes the circuit from the source of current impulses not yet described. If, as is the case, a current impulse is sent over the circuit just traced every time workman No. 1 has earned one cent in wages, his wage register W¹ will at the end of any period or any number of working periods show the total of the wages earned.

It should be understood, in this connection, that the act of closing the switch S¹ serves also to set in operation the associated time register T¹. Such operation is due to the closure of a circuit which may be traced from the positive current main, through the wire 4 and the wire 5, through the electromagnetic actuating mechanism of the register T¹, thence through the upper switch contacts of the switch S¹, thence through the wire 6 to the rotating time brush TB, which dips periodically into the mercury trough MT, which is connected with the negative current main. It is to be noted that whenever a workman's controlling switch is closed, the circuit of the associated time register will be closed over a circuit such as that just traced through the switch contacts TB and MT. If, therefore, the shaft upon which the brush TB is mounted be rotated at a uniform speed, proportional to the lapsation of time, the time registers will be actuated by impulses flowing with a frequency which will cause them to indicate at all times the number of hours with which the respective workmen are to be credited.

If, now, we take up a little more fully a consideration of the selector switches and the rate controlling switch and contactor, we shall understand more clearly how the wage registers are operated to account wages. At DM, is indicated the driving motor, which is supplied with current from the positive and negative mains over a circuit which may be traced through the wire 4 to the brushes of the motor, thence to the full resistance contact of a regulating switch RS, thence through the switch arm to the wire 7 leading to the contacts of a governing rheostat, GR. Normally, the circuit may be traced through the switch arm 8 to the wire 9, and thence to the negative terminal of the direct current source, not indicated. With substantial constancy, the motor DM operates to rotate its shaft and, by means of the gearing indicated, to drive the shaft of the time brush, TB, in the direction indicated by the associated arrow-head. In the system shown in the drawings, the time brush TB dips one hundred times per hour into the mercury trough MT. The gear ratios of the electromagnetically actuated time registers are such that one hundred impulses flowing through the electromagnet will cause an increment of one hour to be registered by the associated numeral wheels.

The wage rate contactor comprises the wage brush WB, carried by and insulated from the shaft of the motor DM and the mercury trough MT, into which also this brush is adapted to dip. In the system shown in the drawings, the shaft of the motor DM revolves at the rate of four hundred twenty revolutions per hour whereby the wage brush WB causes the flow of seven current impulses per minute. At RC, in Fig. 1, is very diagrammatically illustrated the rate controlling switch. Without stopping now to describe the details of its mechanism, let it be understood that at the beginning of every minute the rate controlling switch is given a one-step advancement. The result is to open or close the appropriate switch contacts diagrammatically shown, as may be required to cause the flow of the proper number of current impulses. Assuming that workman No. 1 is to receive twenty-five cents per hour for his labor, the rate controlling switch mechanism will cause the closure of the contacts RC²⁵ and RC²⁵′ twenty-five times per hour, and during each such closure of the rate controlling contacts, the wage brush WB will dip seven times into the mercury trough MT to cause the flow of current impulses. Not all of the seven impulses will, however, flow through the circuit closed between the contacts RC²⁵ and RC²⁵′, because only a single wage register is connected by the plug RP′ with the strip of spring jacks connected with the contact RC²⁵, and the closure of the circuit through this wage register W¹ depends also upon the connection of the segments C¹ and C¹′ of the selector switch with the associated brushes. This selector switch connection with the circuit of the wage register W¹ is maintained only during a single revolution of the wage brush WB. The mechanism is as follows: Upon the shaft upon which the wage brush WB is mounted, there is mounted also a one-toothed driving disk, DD. The tooth of this disk is adapted to mesh in the notches in the periphery of the locking disk LD, whereby each revolution of the shaft of the motor DM causes the one-step advancement of the shaft 3, which carries the brushes of the selector switches. Seven revolutions of the wage brush cause, therefore, a complete revolution of the shaft 3 and the selector brushes. The result is that the circuits of the six wage registers are closed in succession, one after another, and during the closure of each such circuit, the wage brush WB dips once into the mercury trough to cause the flow of a current impulse through any register whose rate controlling plug is inserted in a spring jack connected with a rate controlling contact whose circuit is closed at that time.

It will be noted that the selector switch commutators contain one more segment than there are wage registers. The construction is such that the one-step advancement of the rate controlling switch takes place during the interval in which the brushes of the selector switch move over these unconnected seventh segments. The result is to step the rate controlling switch, and therefore to change its contacts at times at which no circuits through wage registers are closed.

It is to be noted that each of the upper contacts of the rate controlling switch, as shown in Fig. 1, is connected with a strip of spring jacks, whereby any number of the rate controlling plugs associated with the wage registers may be connected with a particular contact of the rate controlling switch. Thus, for example, if workman No. 5 were to receive twenty-five cents per hour, his rate controlling plug would also be inserted in any one of the spring jacks connected with the contact $RC^{25}$. The wage brush WB impresses upon the contact $RC^{25}$ a series of seven impulses. One of these impulses would find a path through wage register $W^5$ and the contacts $C^5$ and $C^{5'}$ of the selector switch. No other impulses could, however, flow through this wage register, because there is a closure of its circuit through the selector switch during only a single one of the series of seven impulses, the shaft 3 being stepped around by the driving disk DD, and the locking disk LD to complete a circuit for the wage register $W^5$ during another of the series of seven impulses, whereby this wage register would also be actuated one step. So, also, any other of the wage registers connected with the same strip of jacks would be advanced one step during the series of seven impulses sent out by the wage brush WB.

It will be apparent that if a workman received sixty cents an hour, he should be connected with a contact of the rate controlling switch which would be closed during each and all of the series of impulses sent out by the wage brush. Once during each minute, therefore, his wage register would be advanced to record one cent earned during each minute of the hour. If a workman received but thirty cents an hour, his rate controlling plug should be connected with a spring jack associated with a contact of the rate controlling switch whose circuit was closed during every alternate minute. The result of this arrangement would be to cause one impulse to flow through the wage register every second minute, and thereby to register wages at the rate of thirty cents per hour. If the wages were earned at the rate of fifteen cents per hour, then the rate controlling plug of the wage register should be connected with a spring jack whose circuit was closed by the rate controlling switch during every fourth minute, but not during the three intervening minutes. In like manner, a workman's register intended to be actuated at a rate of twelve cents per hour would be connected with a contact of the rate controlling switch whose circuit was closed every fifth minute, and so on.

I have cited examples in which the recurrence of the connections made by the rate controlling switch is uniform. If we consider, now, a rate of wages, as, for example, forty cents per hour, it will be apparent that the wage register may be actuated with a sufficiently close approximation to uniformity if a current impulse be sent through it once during the first minute, once during the second minute, and not at all through the third minute, then again, once during the fourth minute, once during the fifth minute, and not at all during the sixth minute, and so on, indefinitely. Such a series of impulses flowing through the wage register in this manner will cause it to be actuated forty times during an hour, and thus to record wages at the rate of forty cents per hour. It will be seen that various other rates can be accommodated, by causing the closure of the circuit as controlled by the rate controlling switch during only certain minutes of the hour. Thus, for example, a twenty-five cent register might be actuated as follows: Once during the first minute, once during the third minute, once during the fifth minute, once during the seventh minute, once during the ninth minute, then skipping, once during the thirteenth minute, once during the fifteenth minute, once during the seventeenth minute, once during the nineteenth minute, once during the twenty-first minute, and, skipping again, to the twenty-fifth minute. It will be seen, in other words, that this amounts to sending an impulse every other minute, which would correspond with a rate of thirty cents per hour, but omitting every sixth impulse, thus leaving twenty-five impulses per hour to actuate the wage register. Where the rate per hour involves a fraction, as, for example, 27.5c per hour, the proper result can be secured by actuating the register twenty-seven times during one hour and twenty-eight times during the next succeeding hour, thus alternating the number of actuations per hour between twenty-seven and twenty-eight. To accomplish this result, it is necessary that the cyclical period of the rate controlling switch be two hours, instead of one hour. In like manner, if fractions of ½¢ and ⅜¢ are to be handled, the period should be, for example, an hour and a half or three hours.

Having described in this way the electrical operation of the rate controlling switch, it may be well to describe a little more fully the mechanical construction which I have devised to accomplish the necessary results. The details of the rate controlling switch are illustrated in Figs. 2 to 8, inclusive. The switch contacts which are designated in Fig. 1 as RC$^{25}$ and RC$^{25'}$ are marked with the same reference characters in Fig. 2. These switch contacts are identical with those shown at RC$^{57\text{-}1/2}$ and RC$^{57\text{-}1/2'}$. The upper contacts are insulated from one another. All of the lower or spring contacts are connected together and with the frame of the rate controlling switch, this multiple connection of the lower contacts being indicated in Fig. 1 by the wire 10, which leads to the wage brush WB. Each of the upper or stationary contacts of the rate controlling switch is connected with a strip of spring jacks, as indicated in Fig. 1. Just above the strip of spring jacks which is connected with the contact RC$^{25}$ is located a smaller strip of spring jacks connected by a wire, not shown, with the stationary contact which delivers say thirty-seven and a half impulses per hour, it being understood that over-time is credited at the rate of time and a half. Each strip of regular spring jacks may have associated with it a set of over-time spring jacks in this manner.

Each of the motor springs, such as RC$^{57\text{-}1/2'}$ and RC$^{25'}$, is adapted to be actuated by a pivoted actuating arm PA. Each arm is equipped with a hardened roller HR, which rides on the periphery of a rate disk such, for example, as that marked RD$^{57\text{-}1/2}$. A number of rate disks are illustrated in front elevation in Fig. 2. Those shown deliver impulses respectively at the following rates, in cents per hour, reading from left to right:

```
 8    10    12½   13    15
20    21½   22    22½   25
27    27½   30    32    32½
40    42½   45    50    57½
```

All of the rate disks are slipped upon the common spindle CS, there being a feather and suitable keyways in order to aline the disks upon the shaft and to prevent slipping. A suitable nut serves to clamp the disks in position between the intervening collars. Each rate disk controls the position of the associated actuating arm PA, thereby controlling the opening and closing of the associated switch contacts.

The spindle CS is intermittently advanced by the ratchet wheel RW, mounted at one end. The power shaft PS has a step by step rotation in the direction of the arrow shown on the drawings, this rotation being derived from the locking disk LD, which is given a step by step rotation by the driving disk DD, as previously explained. The gear ratios are such that the wage brush WB produces seven current impulses during a single revolution of the power shaft PS. The advancing cam AC, mounted upon the power shaft PS, causes an upward swing of the rocking arm RA as it moves from the position shown in the drawing. The cam surface is such as to give the rocking arm a movement sufficient to advance the ratchet wheel RW a single step, the motion being transmitted by the pawl PL. There are one hundred twenty teeth on the periphery of the ratchet wheel RW, and the movement is just sufficient to cause an advancement equal to the space of one tooth. The wage brush, as previously stated, dips seven times per minute into the mercury trough MT. The locking disk and the power shaft PS are therefore given one complete revolution per minute; since every revolution of the power shaft causes the one step advancement of the ratchet wheel RW, it will be clear that the ratchet wheel and all of the rate disks will be given one complete revolution in two hours.

The peripheries of the rate disks are so notched as to cause the closure of the associated contacts during as many minutes as there are impulses to be delivered during the two hour period. Thus, the 8¢ rate disk at the extreme left in Fig. 2 causes the closure of its contacts during sixteen minutes in every two hour period. The 25¢ rate disk causes the closure of its switch contacts during fifty minutes in two hours. A few of the rate disks are shown in side elevation in Figs. 5 to 8, inclusive. Fig. 5 shows the disk properly notched for a rate of twenty-five cents per hour. Fig. 6 shows the disk notched for a rate of ten cents per hour. Fig. 7 shows a disk notched for a rate of thirty-two and a half cents per hour; and Fig. 8 shows a disk notched for a rate of twelve and a half cents per hour. This last disk is, of course, notched, as previously explained, so as to cause the flow of twelve impulses during alternate hours, there being a flow of thirteen impulses during every intervening hour.

Having now described the means by which the various rate disks are conformed to control the associated circuits so that current impulses may be sent over such circuits at desired rates, it is apparent that the main portion of the rate switchboard shown in Fig. 1 may be connected with the upper portion, adapted for over-time, in a manner indicated in Fig. 17. Assuming that the various strips of jacks of the main rate board are connected for 8, 10, 12½, 15, 20, 22½, 25, 27½ and 30 cents per hour, respectively, the corresponding over-time strips of jacks, assuming that the over-time is to be paid at time and a half, would be so connected to the circuit controlling disks as to correspond to rates of 12, 15, 18¾, 22½, 30, 33¾, 37½, 41¼ and 45 cents per hour, respectively. Such connections are indicated diagrammatically in Fig. 17, it being understood that the rate-controlling disks connected with the over-time jacks are constructed to so control the associated circuits as to communicate thereto impulses of the number described. Obviously, other similar arrangements can be made for other rates of over-time or for other rates per hour.

With this explanation of the rate controlling mechanism, a little more comprehensive idea of the operation of the whole system may be gained. It will be apparent that the rate plug of any workman's circuit may be inserted in any of the spring jacks connected with the stationary contacts of the rate controlling switch. The selector switch switch mechanism successively closes the circuits of the workmen's registers at another point. Thus, each workman's individual circuit is closed once in every minute by the selector switch. If during that minute the rate controlling switch has closed also the circuit of a spring jack in which the workman's rate plug is inserted, a complete circuit will be established for the flow of an impulse delivered from the wage brush WB. The wage brush makes contact as many times in each minute as there are or may be workmen whose accounts are to be handled, and preferably one or two or three contacts in addition. Thus, if there are six workmen, the wage brush is driven at the rate of six plus one, or seven revolutions per minute. If the system were intended to handle a total of fifty workmen, then the wage brush might be driven at the rate of, say fifty-one of fifty-two revolutions per minute. Corresponding with this operation of the wage brush, the selector switch must be stepped along from segment to segment so as to close the circuit of each workman's register once in each minute. As previously explained, the rate controlling switch and the rate plugs and spring jacks enable the connections to be established in a manner such that each workman's wage register will receive, during a two hour period, a number of current impulses equal to the number of cents with which he is to be credited during that period.

The purpose of the one, or two, or three additional rotations or actuations of the wage brush is merely this: The rate controlling switch is advanced but once per minute. This advancement should take place during an interval when no workmen's individual registers are in closed circuit. By putting one or two or three blank segments in the selector switch, as, for example, a seventh segment in the switch shown in Fig. 1, it is possible to cause the one step advancement of the rate controlling switch during that interval in which the brushes of the selector switch are moving over the idle segments. The result is that the mechanism of the rate controlling switch remains stationary and fixed throughout that part of each minute during which the workmen's individual registers are included in circuit by the selector switch. There is no purpose in causing the wage brush to make the extra revolutions and contacts except that in the mechanism shown the advancement of the selector switch mechanism is controlled by the driving disk mounted on the shaft of the wage brush. It is, therefore, convenient to permit the wage brush to make the extra contacts, although no current is caused to flow as a result of these extra contacts.

It will be apparent that the operation of the mechanism thus far described will cause each workman's wage register to indicate at all times the amount of wages earned by him. A workman starting in on Monday morning with his wage register at zero, will at noon-time be able to read from his register the amount of wages he has earned during the morning. When he stops work at noon-time, he may open his individual switch as, for example, $S^1$, thereby preventing the further flow of impulses through his wage register. When starting work again in the afternoon, he closes his individual switch, whereupon impulses again flow, causing the register again to be actuated, whereupon at night time he may read the total of his wages for the day. If, as is preferable, the wage register is not re-set to zero at this time, the wages earned on Tuesday will be added to those indicated by the wage register for Monday. At the end of the week, the total of his wages may be read from the wage register. In order for these results to be accomplished with accuracy, it is, of course, necessary that the current impulse mechanism be governed closely, as by a clock. My invention provides such governing or regulating means, which may be described as follows, with particular reference to Fig. 1.

Generally stated, the scheme of regulation contemplates a driving motor, which has an automatic mechanism for stopping it at the end of one minute's operation; or, rather, the motor is automatically stopped slightly before the end of a one minute interval. A clock serves automatically to trip or start the motor at the commencement of each minute. This starting of the motor is very accurately controlled by the clock, and therefore it does not matter much whether the motor runs for fifty seconds or for fifty-nine seconds before it is stopped. In any event, it is regulated so that it will not run for more than a minute before it is stopped. The result is to make the operation of the motor and the impulse sending mechanism which is driven thereby, correspond with the elapse of time as measured by the clock, and the stopping of the mechanism for one or two seconds before the commencement of each minute will not interfere in any way with the proper operation of the system. The apparatus for carrying on this mode of operation is illustrated in Fig. 1, where the governing clock is shown at GC. This clock serves, at the commencement of each minute, to close a circuit which may be traced as follows: from the positive main through the wire 11 to the controlling brush CB, thence to the metal portion of the periphery of the controlling disk CD, thence through the wire 12 to the internal mechanism of the clock GC, where a switch (not shown) closes the circuit at the commencement of each minute. Continuing, the circuit may be traced through the wire 13 to the normal contact 14, thence through the wire 15 to the electromagnet 16 of the governing rheostat GR, and thence to the negative main. When the electromagnet 16 is energized, it attracts its armature to throw the lever 8 into its intermediate position, where a circuit through the driving motor is closed as follows: from the positive main, through the wire 4, through the driving motor DM, thence through the resistances of the regulating switch RS to the wire 7, thence through the resistance of the governing rheostat GR to the lever arm 8, and thence through the wire 9 to the negative main. The full strength of the current is not permitted to flow, on account of the resistance of the governing rheostat. The motor, however, starts and sets in operation the power shaft PS, which by the rheostat cam RC' soon throws the lever 8 into its final closed position, as shown in the drawings. The flow of current through the electromagnet 16 is stopped by the opening of the switch in the governing clock as soon as the driving motor DM has been well started. The rheostat cam serves, however, to hold the switch arm 8 in its closed position during one complete revolution of the power shaft PS. The speed of the motor DM is such that shortly before the expiration of one minute's time, the power switch PS will have rotated through a complete revolution, whereupon the roller of the arm of the governing rheostat will drop into the notch of the periphery of the cam, thereby opening the circuit which supplies current to the driving motor DM. This circuit will continue open until the commencement of another minute, whereupon the switch of the governing clock GC will be closed again to energize the electromagnet 16, whereupon the motor will be started and caused to run, as previously explained. This cycle of operation will continue over and over again, it being apparent that so long as the speed of the driving motor is such as to cause a complete revolution of the power shaft PS in slightly less than one minute's time, it is not material that the speed of the motor should be constant as is that of a clock.

It is many times desirable, in a system of this kind, that the impulses should flow only during regular working hours, as from 8 in the morning until 12 noon, and again from 1 until 6 o'clock in the afternoon. To arrange automatically for this operation of the mechanism, I provide the controlling disk CD and the controlling brush CB. These are clock driven by suitable gearing, as shown. The periphery of the controlling disk is of insulating material, except at those parts which come into connection with the controlling brush during the regular hours of work. When the metallic sector of the disk comes into contact with the controlling brush at 8 o'clock in the morning, the clock switch energizes the electromagnet 16, whereupon the driving motor DM is started, and this minute by minute energization of the electromagnet will continue until 12 o'clock noon, when the energizing circuit is opened by the engagement of the insulating sector of the controlling disk with the controlling brush CB. Again, in the afternoon at the proper hour, the circuit is again closed through the controlling brush and disk, whereupon the energizing impulses flow again once each minute until 6 o'clock p. m., when they are again shut off for the night.

If it is necessary for some or all of the men to work over-time, and it is desired to pay all of them at an increased rate, it is but necessary to throw the regulating switch RS into an advanced position, in which the resistance in the circuit of the driving motor DM will be decreased and in which also the switch arm terminates the wire 15 will be connected with the contact 17 instead of the contact 14. This contact 17 is connected with a switch, not shown, in the mechanism of the governing clock GC. This switch instead of being closed at the commencement of each minute will be closed at, say, the commencement of each forty-eighth second. The result is that the driving motor will be started once in each forty-eight seconds, instead of once in every sixty seconds, and the decreased resistance in the circuit of the driving motor will cause that motor to run at a speed such that the power shaft PS will have completed a single revolution shortly before the expiration of the forty-eight seconds period. The result is that the actuating impulses will be sent through the registers at an increased rate proportional to pay on the basis of time and a quarter, for over-time. It will, of course, be understood that the controlling disk CD will not supply current for the energizing impulses during the night time, and it will be necessary, therefore, to throw the over-time switch OS into its alternate position in order that the current may be supplied for the periodic energization of the tripping magnet 16.

If the over-time is to be credited at the rate of time and a half, the regulating switch RS may be thrown into its final position in which the energizing impulses will be caused to flow at the commencement of every fortieth second, the operation of the mechanism being correspondingly speeded up by the reduction of the resistance in the circuit of the driving motor DM.

The circuit-closing mechanism operated by the clock GC to control the driving motor DM in the manner just above described is illustrated in Fig. 18, in which the shaft GC' is driven by the clock mechanism, and by means of the gears GC² and GC³ drives the commutator GC⁴ so that the latter makes one revolution per minute, thus making contact between the metallic portion of the commutator and the brush GC⁵ at the beginning of each succeeding minute. This circuit is maintained through the wire 13 for a sufficient interval so that the shaft PS, by its rotation, moves the rheostat arm 8 to a position cutting out the starting resistance, thus insuring the rotation of the motor DM to the end of its cycle of operation, regardless of whether the circuit be subsequently maintained by the commutator GC⁴ or not. The shaft GC' serves to drive commutators GC⁶ and GC⁷ through gears GC⁸, GC⁹, GC¹⁰ and GC¹¹ at such rates that these commutators rotate once in 48 seconds and once in 40 seconds, respectively, thus serving to close the circuits connected therewith, as described above, when the regulating switch RS is moved to establish operating circuits from the brushes associated with such commutators.

With this description of the governing mechanism, it will be understood that with but a rough approximation to constancy in the speed of the driving motor, a clock may be made to control the operation substantially in accordance with the lapse of time which should be the basis for the wages registered. The slackening in speed, or even the actual stopping of the mechanism for two or three seconds at the end of each minute, could have no injurious effect on the operation of the system as a whole. Furthermore, my invention provides automatic means for starting and stopping the operation of the mechanism at those hours which have been pre-arranged as the hours for regular work. So, also, my invention provides a simple and effective means whereby the operation of the entire system may be speeded up to take account of over-time at one or more rates. In this connection, it may be well to state that while the regulating switch RS serves to increase the speed to provide over-time rates for all of the workmen's registers, the strips of spring jacks connected with the rate controlling switch provide a means for putting one or more workmen on an over-time basis, while the wages of the other workmen are continued at the regular rate. It is to be noted, in this connection, that when the speed of the driving motor is increased, as for the purpose of crediting the workmen for overtime, the speed of the time brush TB will be correspondingly increased, whereupon the impulses which actuate the time registers will be increased in frequency corresponding with the increased rate of pay. The workmen's time registers will, therefore, indicate an hour and a quarter instead of one hour whenever the regulating switch RS is in the time and a quarter position; so, also, when this switch is thrown into its final position, the time registers will register an hour and a half instead of one hour, as is normally the case.

Thus far we have considered the workmen's individual time and wage registers, the mechanism for controlling or generating the current impulses which actuate these registers, and the switching mechanism whereby each workman's register will be actuated at a rate corresponding with his wages. We come now to a consideration of the more purely accounting features of my system. In the first place, my invention provides individual job registers, one of which may be assigned to each job in process and each such job register will record and indicate the total of the wages earned in work upon that job. Means is provided whereby the circuit for each workman's wage register must be completed either through some job register or a waste wage register. Any number of individual workmen's circuits may be completed through the circuit of a given job register, whereby any number of workmen may be assigned to a particular job and all of their wages will be totalized in the register which handles the job cost account.

The details of the mechanism are indicated in Fig. 1 of the drawings, where I have shown at WS a strip of spring jacks assigned to and connected with the foreman's waste wage register FW and the manager's waste wage register MW. The individual job registers are indicated at J¹, J²  . . . J⁶. Each of these job registers is connected by a wire, as shown, with a strip of spring jacks, the strips of jacks being indicated at $JS^1$, $JS^2$ ... $JS^6$. Tracing the flow of impulses coming, say, through the foreman's plug $FP^1$, we may assume that this plug is inserted in one of the strips of spring jacks marked $JS^2$, such an insertion of the plug by the foreman corresponding with the assignment of workman No. 1 to job No. 2. The impulses coming at a rate corresponding with the workman's rate of wages, will flow from the strip of spring jacks through the wire to the electromagnetic mechanism of job register $J^2$, thence through the common wire which leads from all of the job registers to the job total register JT, thence through a wire which leads through wage magnet WM of the total cost register TC, thence through a wire which leads through the wage total register WT and thence by way of the wire 18 and the wires 5 and 4 to the positive pole of the battery, or other source of current. It will be apparent that if workman No. 1 receives wages at the rate of 25¢ per hour, and therefore impulses at the rate of twenty-five per hour, these impulses will flow at that rate over the circuit just traced, causing the step by step advancement of all of the electromagnetic register mechanisms in the circuit. The flow of twenty-five impulses through the workman's wage register will, therefore, be accompanied by the twenty-five step advancement of the job register $J^2$, the job total register JT, the total cost register TC and the wage total register WT. The foreman may insert the plug terminal of any other workman's circuit also in one of the spring jacks of the strip $JS^2$, thereby causing another set of impulses to flow over the circuit just traced. In like manner, any number of the workmen may be plugged onto job No. 2, and since no two impulses flow at the same time, each of the totalizing registers in the circuit just traced will be actuated by an amount corresponding with the total of the wages earned by all of the workmen assigned to job No. 2. In like manner, any one or more workmen may be assigned to any other job, and accordingly the foreman may insert the plug terminal of the workman's circuit in a corresponding spring jack. No matter which of the job registers may thus be included in the circuit, all of the impulses for all of the jobs will flow through the job total register JT, thence through one of the electromagnetic actuating mechanisms of the total cost register TC and thence through the wage total register WT. If there were no other operation of these totalizing registers, we should therefore have in each of them an indication of the cost of the labor on all of the jobs in process, each job register indicating the total cost of the wages earned upon that job. There are, however, many accounting operations which affect some or all of these registers. In the first place, the waste wages are added to the total which is indicated by the wage total register WT, while this factor is not added or indicated by the job total register JT. The reason for this will be apparent, when it is considered that the wire from the waste wage spring jacks WS leads through the foreman's waste wage register FW, thence to the manager's waste wage register MW, and thence to the total wage register WT. Any workmen whom the foreman cannot assign to a productive job are assigned by him to the waste wage class, their plugs being inserted in the spring jacks of the strip WS. Their current impulses, therefore, flow over the circuit just traced, and through the wage total register WT, but not through any of the job registers nor through the job total register JT, nor the wage magnet of the total cost register TC. The result is that the total of the waste wages is indicated both by the foreman's waste wage register FW and by the manager's waste wage register MW, these being located at different points in the factory, and the waste wages are added also to the indication of the wage total register WT, it being apparent that all of the current impulses coming from the workmen's wage registers must flow through the total wage register TW, regardless of whether they reach this register through the waste wage registers or the job registers and the totalizing registers in circuit therewith. We have, therefore, in the job total register JT a current showing of the total wages earned on all of the productive jobs. We have in the foreman's waste wage register and in the manager's waste wage register a current showing of all of the waste wages, and we have in the total wage register WT a current showing of all of the wages, whether productive or non-productive.

The operation of the totalizing registers is also, in some degree, affected by the mechanism which my invention provides for accounting the material which enters into a completed job. In other words, my invention provides an automatic means for securing not only the total wage cost of the various jobs, but for securing in addition the material cost. As a result of this arrangement, each job register indicates not merely the total wage cost of the job, but the total of wages and material. Generally speaking, the material cost is handled by a keyboard mechanism adapted to send any pre-determined number of current impulses at a high rate of speed. If, for example, material is issued against a job to the amount of thirty-eight cents, the key-board mechanism may be set manually to send thirty-eight current impulses. If material is issued to the amount of $4.67, the keyboard mechanism may be as readily set for 13 this amount, whereupon four hundred sixty-seven current impulses will be sent at a high rate of speed. These current impulses are directed by suitable switching mechanism through the electromagnetic actuating mechanism of the proper job register. The circuits over which these manually controlled impulses are sent contain also various totalizing registers, which furnish a current showing of important net and total sums.

Without stopping now to describe in detail the key-board and the associated impulse sending mechanism, let it be assumed that the key-board KB, as shown in Fig. 1, is adapted to cause the interrupter switch IS to close the circuit in which it is included any desired number of times, as controlled by the set up of the keys. The wire 19, which leads from the interrupter switch IS, terminates in the tip of the accountant's primary plug AP', the sleeve of this plug being connected with the tip of the accountant's secondary plug AP². The sleeve of the secondary plug is connected with the positive pole of the source of current, and the disk or commutator of the interrupter switch is connected with the negative pole. The interrupter switch is, therefore, adapted to send current impulses through any circuit with which the accountant's plugs may be connected. These accountant's plugs are used for various purposes. By the use of these plugs and the associated key-board, the accountant is able: First. To clear the individual wage registers. Second. To clear the current wage total register into the prior wage total register. Third. To clear individual registers into the current total time register. Fourth. To clear the current total time register into the prior total time register. Fifth. To add the cost of material to the showing of any individual job register and also to the indication of the current total material register and the current total cost register. Sixth. To clear the individual job cost registers, and at the same time to subtract equal amounts from the current total cost register and at the same time add these amounts in the prior total cost register. Seventh. To clear the current job total register into the prior job total register. Eighth. To clear the manager's waste wage register into the prior waste wage register. Ninth. To clear the current total waste register into the prior total material register. Tenth. To clear the value of wasted material or to clear other amounts from the various individual and total registers. Eleventh. Generally to add or subtract from the indications of any of the registers any desired charges or amounts.

A series of spring jacks lettered L, K, J, I, H, G, F, E, D, provides means whereby the appropriate circuit connections may be established to and with many of the required registers. Actuation of other of the registers is, for the most part, effected by the use of an individual spring jack associated with each such individual register.

Taking up now the various results which the accountant may wish to accomplish, we may first consider the operations necessary to clear the individual wage registers. For this purpose, the accountant's primary plug AP' is inserted into spring jack L and the plug AP² into the spring jack associated with the wage register to be cleared. If, for example, wage register W is to be cleared, the accountant's secondary plug will be inserted into the spring jack associated with this register. The operator then sets up upon the key-board mechanism KB the complement of the reading of the individual wage register W². The key-board go' key KG is then actuated to set the key-board mechanism in operation, whereupon the interrupter switch IS causes the flow of a number of current impulses corresponding with the number set up on the key-board that is the complement of the reading of the wage register in question. The flow of these impulses may be traced from the interrupter brush IB through the tip of the plug AP' through the short circuited springs of the jack L, thence through the tip of the secondary plug AP² to the tip spring of the spring jack of wage register W², thence through the electromagnetic mechanism of that register to the sleeve spring of the associated jack, thence through the sleeve contact of the secondary plug AP² to the battery or other source of current. The individual wage registers will ordinarily be advanced to their zero positions at night time, or when they are not subject to the flow of wage impulses. It is obvious that any individual wage register may be cleared in the manner just described.

Coming now to the second function of the accountant's key-board and switching mechanism, we have to consider the means for clearing the current wage total register into the prior wage total register. The current wage total register is indicated on the drawing at WT, the prior wage total register being shown at WT'. For this purpose, the accountant's primary plug is inserted into the spring jack G, the secondary plug being inserted into spring jack I. Under these conditions, current impulses to flow from the interrupter brush IB may be traced through the tip of the plug AP', thence to the tip spring of jack G, thence through the electromagnetic actuating mechanism of the register WT', thence through the electromagnetic mechanism of the current wage total register WT, and thence to the other pole of the source of current supply. The set up on the key-board is, as before, the complement of the reading of the wage total register WT, which is to be cleared. Accordingly, with this set-up, the interrupter switch sends out a number of impulses corresponding to the complement of the reading to be cleared, with the result that the numeral wheels of the current wage total register are advanced to their zero position. The electromagnetic driving mechanism of the prior wage total register WT' is arranged to actuate the numeral wheels of that register in the reverse direction. The result is that while the complemental number of impulses restores the current wage total register to its zero position, it actuates the numeral wheels of the prior wage total register WT' in the reverse direction by an amount equal to the key-board set-up. In other words, the complemental number is subtracted from the indication on the face of the prior wage total register. To take a concrete example, it may be assumed that the current wage total register has three numeral wheels and the prior wage total register four numeral wheels. If, under these circumstances, the reading of the current wage total register is 750, the key-board set up will be 250, which is the complement of 750. Two hundred fifty impulses will, therefore, flow to advance the numeral wheels of the current wage register to 000 position, at the same time subtracting 250 from the reading of the prior wage register. If this register is started from its 0000 position, the result will be an indication of 9750. This reading will be correct as to the 750, but the 9 must be corrected in order that the correct amount should appear. This correction is accomplished by an auxiliary electromagnet $wt'$, which, when energized, acts to advance the highest order wheel of the associated register one step. The mechanism for accomplishing this end will hereinafter be more fully described. Suffice it for the present to explain that the circuit of the electromagnet $wt'$ is automatically closed upon the insertion of the accountant's plug in the spring jack G, there being auxiliary switch contacts $g$ which are closed upon the insertion of the plug. These auxiliary contacts control the flow of a current impulse, which, upon the actuation of the go key KG, may be traced from the negative pole of the battery or source of current through the go key, thence by wire 20 to one of the auxiliary contacts $g$, thence from the other contact of this auxiliary switch through the electromagnet $wt'$ to a common wire which leads to the wire 5, and thence to the positive pole of the battery. The flow of a single current impulse over this circuit advances the numeral wheel or wheels of the prior wage total register WT' to correct the error in the reading of this register which would otherwise result from its reverse actuation by a number of impulses equal to the complement of the number cleared from the current wage total register. If the prior wage total register already indicates an accumulation of prior wages, the operation already described results in an addition to the final reading of the prior wage register of an amount equal to the direct reading which is cleared from the current wage register. It will be seen from this description that the mechanism is pre-arranged in a manner such that the current wage total register cannot be cleared except as the prior wage total register is counterbalancingly actuated. The result is that the current wage total register may be cleared at the end of the week or other pay-roll period, while the prior wage total register will indicate the total wages to date, as, for example, from the beginning of the fiscal year.

If it be desired to clear an individual time register into the current total time register TT, the accountant's primary plug is inserted in spring jack J and the secondary plug in the spring jack associated with the individual time register to be cleared. Thus, for example, if time register $T^3$ is to be cleared, the accountant's secondary plug will be inserted in the spring jack of the individual time register $T^6$. The operator then sets up upon the key-board the complement of the reading of the register $T^3$ and depresses the go key KG. This sets in operation the interrupter switch, whereupon the complemental number of current impulses is caused to flow over a circuit which may be traced as follows: From interrupter brush IB through the tip of the plug AP', the tip spring of the jack J, thence through the electromagnetic mechanism of the toal time register TT to the sleeve spring of the jack J, thence from the sleeve of the plug AP' to the tip of the plug $AP^2$, thence from the tip spring of the spring jack of the register $T^3$ through the electromagnetic mechanism of that register to the tip spring of the associated jack, thence to the sleeve contact of the plug $AP^2$ and through the wire to the other side of the battery. Here, as before, the auxiliary electromagnet $tt$ of the total time register is energized once to correct the error due to the flow of the complemental number of impulses instead of the direct number. With this description and what has gone before, it will be understood how the individual time registers may be cleared successively, one after another, whereby the total of the readings of the individual registers will be made to appear on the face of the total time register TT.

It is to be noted that the individual time registers are actuated by impulses which flow simultaneously through all of the time registers, this being in contradistinction with the individual wage registers, in no two of which an actuating impulse flows at the same time. The successive flow of the impulses through the individual wage registers enables me to actuate concurrently a totalizing register. The totalizing register cannot be actuated concurrently by the flow of the impulses which actuate the individual registers when the impulses flow simultaneously through all of them, as in the case of the time registers, but the key-board impulse mechanism just described enables the total of the readings of the individual registers to be indicated automatically as the individual registers are re-set to their zero positions.

Another result which may be accomplished is that of clearing the current total time register into the prior total time register TT'. For this purpose, the accountant's primary plug is inserted into the spring jack K, and the secondary plug into the short circuiting spring jack L. The complemental reading of the current total time register is set up on the key-board KB, whereby the flow of impulses may be traced from the tip of the primary plug AP' through the tip spring of the jack K, thence through the main electromagnetic mechanism of the prior register TT', thence through the main electromagnetic mechanism of the current total time register TT, thence to the sleeve spring of the jack K and to the battery. Here, as before, the depression of the go key KG causes the flow of a current impulse through the contacts of the auxiliary switch $k$ and the auxiliary electromaguet $t'$ of the prior total time register, thereby correcting the error which would otherwise appear. This operation permits the current total time register to be cleared periodically, whereas the prior total time register accumulates the time as cleared from the current total time register.

The next operation to be considered is that of adding the cost of material to the showing of any individual job register and properly to actuate the appropriate totalizing registers. For this purpose, the accountant's primary plug is inserted into spring jack H, and the secondary plug into the spring jack associated with the register assigned to the job which is to be charged with the cost of the material in question. Having inserted the plugs, the operator sets up on the key-board KB an amount corresponding with the cost or value of the material to be charged. He thereupon actuates the go key KG, whereupon the interrupter switch is set in operation to send out a number of impulses corresponding with the value of the material. The flow of these impulses may be traced as follows: From brush 18 through the tip of the contact of the primary plug AP', the tip spring of the jack H, thence through the material magnet MM of the total cost register TC, thence through the electromagnet of the total material register TM to the sleeve spring of the jack H, thence through the sleeve of the plug AP' to the tip of the plug AP² thence to the tip spring of the jack associated with the job register to be actuated, say, for example, job register J⁴, thence through the electromagnetic mechanism of that register to the sleeve spring of the associated jack, and thence by way of the sleeve of the plug AP² to the battery. It will be apparent that the flow of these impulses will advance the individual job register J⁴ an amount corresponding with the value of the material charged to that job, whereby the value of the material will be added to the labor cost of the job J⁴. So, also, the material magnet of the total cost register TC will advance that register an amount equal to the value of the material charged. In like manner, the total material register will be advanced a corresponding amount. The result is that the total material register will indicate the total value of the material issued to all jobs; the total cost register having two sets of electromagnetic actuating mechanism, will indicate the total, both of productive wages and material applied to all of the jobs in process.

It will be apparent that by setting up the complemental number on the key-board while the plugs are inserted in these same spring jacks, an actuation of the registers corresponding with a refund or rebate of material may be accomplished. The utility of this is when, for example, a stock clerk issues $2.30 worth of brass tubing and the workman uses all but 40¢ worth, which he returns to the stock room, the 40¢ can be credited to the individual job and deducted from the readings of the totalizing registers to which the $2.30 has been charged. It may, perhaps, be well to explain in this connection that the stock room clerk can be instructed to make out a slip or memorandum with pencil and paper to show each issue of material and also the job to which it is issued. These memoranda may later be turned over to the accountant, who at night, for example, may operate the key-board and switching mechanism to charge or credit the individual jobs, as previously described. If, with the system shown in this application, it were attempted to enter the material cost in the individual job registers concurrently with these actuations in the accounting of current wages, a slightly erroneous operation might take place for the following reason. The current impulses corresponding with current wages flow periodically through an individual job register. If now other current impulses are sent through the same register to charge material cost, it may readily happen that two impulses from the two different sources will flow through the register at the same instant of time, the result in the register being the flow of but a single impulse. The effect, therefore, of one of the impulses would be lost insofar as the actuation of the register is concerned. If the register is actuated by impulses each corresponding to 1¢ in value, there will be an error of 1¢ for each such conflict between the sets of impulses. In case this slight error is of importance, care may be taken to introduce the material cost at a time when there will be no interference with the flow of wage impulses.

The next operation to be considered is that of clearing an individual job cost register, as, for example, when the job is completed, and at the same time subtracting the cost of the job from the showing in the current total cost register while at the same time adding the amount to the showing in the prior total cost register. For this purpose, the accountant inserts his primary plug in the spring jack E and the secondary plug in the spring jack associated with the individual job register which is to be cleared, say, for example, $J^6$. Having inserted the plugs, the complement of the reading of the individual register $J^6$ is set up on the key-board KB and the go key actuated. The proper number of current impulses is thereupon caused to flow from the interrupter brush through the tip of the plug AP′, to the tip spring of the jack E, thence through the main electromagnetic mechanism of the prior total cost register TC′, thence through the material magnet of the current total cost register TC, thence to the sleeve spring of the jack E through the sleeve of plug AP′, the tip of the secondary plug $AP^2$, the tip spring of the jack associated with register $J^6$, the electromagnetic mechanism of that register, the sleeve spring of the associated jack, and thence through the sleeve of the secondary plug to the battery. For one thing, these curent impulses advance the individual job register $J^6$ to its zero position. Furthermore, they add to the indication in the current total cost register TC an amount equal to the complement of the reading cleared from the individual register. The complemental amount is subtracted also from the reading of the prior total cost register TC′. The auxiliary magnets of the current total cost register and the prior total cost register are actuated by an impulse controlled by the auxiliary contacts $e$ of the jack E, as previously described, to correct the error resulting from complemental actuation of these totalizing registers. Since the current total cost register is actuated in a forward direction by the complemental number of impulses, the auxiliary magnet acts upon the numeral wheel of highest order in the reverse direction, whereas in the prior total cost register, in which the complemental number of impulses effects a subtraction and wherein, therefore, the auxiliary electromagnet advances the numeral wheel of highest order. The result of the actuation is to subtract from the current total cost register the cost of any job as cleared from the individual job register, whereas the amounts as cleared from the individual job registers are added in the prior total cost registers. The current total cost register shows, therefore, at all times the cost to date both for wages and material, of all jobs in process. The prior total cost register shows automatically the total cost of all completed jobs.

The next operation to be considered is that of clearing the current job total register JT into the prior job total register JT′. From the previous explanation, it will be understood that the current job total register JT indicates at all times the total of the current wages earned on all of the jobs $J^1$ to $J^6$. The showing of the register JT plus that of the manager's waste wage register MW at all times equals the showing of the total wage register, WT. At the end of a pay-roll period, it may be desired to clear the current job total register in order that the total productive wages for the new period may be recorded. The prior job total register JT′ is intended to receive the amounts cleared from the current job total register JT, so that the prior job total register JT′ will show the total of the productive wages from the beginning until the end of the last pay-roll period. To effect the transfer between these two registers, the accountant's primary plug AP′ is inserted into the spring jack D, the secondary plug $AP^2$ being inserted into the spring jack L. The key-board having been set up to an amount corresponding with the complemental reading of the current job total register JT, the go key KG is depressed, whereupon the complemental number of current impulses flows from the interrupter brush IB through the tip of the plug AP′, the tip spring of the jack D, the main electromagnetic actuating mechanism of the prior job total register JT′, the electromagnetic actuating mechanism of the register JT, thence to the sleeve spring of the jack D to the sleeve of the plug AP′, and thence through the short-circuiting spring jack L to the source of current. The flow of the complemental number of impulses returns the current register JT to its zero position, subtracting also the complemental number from the reading of the prior register JT′. The closure of the auxiliary contacts $d$ associated with the spring jack D serves, however, to cause the flow of a single current impulse through the auxiliary actuating magnet $jt'$ of the register JT′, thereby advancing one space the proper numeral wheel of the register JT′ to correct the indication, as previously described. The result is that any amount which is cleared from the current register will be added to the indication of the prior job total register JT'. If, as previously explained, the current job total register is cleared at the end of every pay-roll period, the prior job total register JT' will show the sum of all productive wages up to the end of the last pay-roll period.

Another result which it may be desirable to accomplish is to clear the manager's waste wage register MW into the manager's prior waste wage register MW'. For this purpose, the primary plug is inserted in the spring jack F and the secondary plug in the spring jack L. The key-board is brought into play as described in connection with the clearance of the current job total register JT, and in like manner, the manager's waste wage register MW may be cleared into his prior waste wage register MW'. It will be unnecessary to describe in detail the operation of the mechanism. The result of the operation is to afford the manager, in his current waste wage register MW, a showing of the waste wages commencing at such times as he may wish. He may clear or have cleared his waste wage register every night, so that he will have each day a showing, in his current register, of the waste wages for the day. He may, on the other hand, prefer to let the current waste wage register run on for the whole of a week or other pay-roll period before it is cleared and returned to zero. The manager's prior waste wage register MW' shows, of course, the total of the waste wages up to the beginning of the period for which the current waste wage register indicates the total. Ordinarily, the foreman's waste wage register FW is not cleared.

The next operation to be considered is that of clearing the current total material register TM into the prior total material register TM'. This clearance need not and ordinarily would not be complete. The partial clearance of the total material register would ordinarily take place when a job is completed, and the individual job register is cleared. In view of the illustration and description of the total cost register TC, I have not deemed it necessary to illustrate for each individual job a pair of registers, one assigned to material and the other to wages, either with or without a totalizing register for showing the total of wages and material for the individual job. While, therefore, each individual job register shows the total of wages and material, there is no automatic showing of the distribution of this total between wages and material. In the form of the invention shown in Fig. 1 of the accompanying drawings, therefore, it would be necessary for the stock-keeper, for example, to keep a record of the total of the material charged to each job. When, therefore, a particular job is completed and the job register is to be cleared, the stock-keeper will determine, from his records, the total of the material charged to that job, and this amount will be cleared out of the current total material register TM and into the prior total material register TM'. For this purpose, the primary plug will be inserted into the spring jack I and the secondary plug into the short-circuiting jack L. As in the case of the clearance of the current job total register, the key-board will be set up in conformity with the complement of the amount which is to be cleared from the current total material register and transferred into the prior total material register TM'. The flow of impulses will take place as previously described, and the proper correction in the showing of the prior total material register TM' will be effected by the impulses controlled by the auxiliary contacts $i$ of the spring jack I. By effecting such transfers from the current total material register to the prior total material register, the reading of the current total material register will correspond at all times with the total of the material which is charged to jobs in process. The prior total material register will show the total value of material charged to completed jobs.

The next operation to be considered is that of clearing the value of rebated material, for example, from various individual and total registers. More generally stated, the operation is to clear or subtract from the showing of any register any desired amount. As an illustration, we may consider the individual job register $J^2$, and may assume that material to the value of $98.40 has been issued to the job and that the workman upon the job has returned to the stock room $12.20 worth of that material. In order that the individual job register may show the total cost, it is obviously necessary to subtract from the indication of the individual register $12.20 upon the return of the unused material. To effect this partial clearance, the primary plug AP' is inserted into the spring jack H and the secondary plug into the spring jack of the job register $J^2$. The complemental number corresponding with the amount to be cleared is then set up on the key-board. Assuming an individual register of five numeral wheels, and that the amount to be rebated is $12.20, the key-board set up would be 987.80. Upon depressing the go key with this set-up, current impulses would flow from the interrupter brush to the tip of the plug AP', thence through the tip spring of the spring jack H to the material magnet of the current total cost register TC, thence through the electromagnet of the total material register TM and thence to the sleeve spring of the jack H; continuing, the current flows to the tip of the plug AP², thence from the tip spring of the spring jack of the register J³ through the electromagnet of the job register J³ to the sleeve spring of the associated jack, and thence from the sleeve of the plug AP² to the return side of the source of current. The flow of the complemental number of impulses advances the individual job register up to the zero position, and beyond to an amount which is less than the initial reading by the amount of material which has been rebated; that is to say, the showing of the individual job register will be $12.20 less after the flow of the complemental number of impulses than before. In like manner, the flow of this same number of impulses through the electromagnet of the current total material register TM, which also is a five numeral wheel register, will cause the final showing of that register to be less than its initial showing by the same amount, $12.20. The same may be said of the current total cost register, TC. In like manner, any required subtraction from the showing of any of the registers may be effected.

I have described in more or less detail only a few of the operations which may be effected. It will be apparent that many other combinations of registers may be arranged to correspond with the requirements of the accountant. Generally, it will be apparent that additions to or subtractions from the indication of any register may be effected by causing the proper number of current impulses, as controlled by the keyboard mechanism, to flow therethrough. By making the key-board set up correspond with the direct reading or with the complemental reading of the required amount, the final result in the showing of the register may have the effect of addition or subtraction, as previously explained.

Having cited these various examples of the uses which may be made of the apparatus of my invention, it will be appropriate to describe a little more in detail the registers and the electromagnetic mechanism for actuating them. For this purpose, I have taken the most complex example in the system illustrated in Fig. 1, namely, the current total cost register TC. It will be remembered that this register was equipped with two main electromagnetic actuating mechanisms marked respectively WM and MM, and also with an auxiliary actuating magnet tc. These parts and the others by which they coöperate are illustrated in Figs. 15 and 16. The numeral wheels with the proper carry-over wheels are indicated in these drawings at N¹, N², N³, N⁴ and N⁵. These numeral wheels are, with the exception of the numeral wheel N¹, loosely mounted upon the spindle SP. The numeral wheel of lowest order is keyed or otherwise attached to the spindle. At the opposite end of the spindle is mounted a driving pinion DP, which meshes with the common gear CG of a differential totalizing gear whose individual gears IG¹ and IG² are respectively actuated by the wage magnet WM and the material magnet MM. Fig. 15 illustrates the actuating mechanism associated with the material magnet MM, and this is substantially a duplicate of the mechanism associated with the wage magnet WM. The armature is shown at MA. It is equipped with a retracting spring RS and with a pivoted actuating pawl AP, which engages with the teeth of a ratchet wheel MR which is attached by means of the sleeve SM to the individual bevel gear IG². A counter-weighted detent CW is pivoted in position to prevent the backward rotation of the ratchet wheel MR and the associated parts. When, therefore, the electromagnet MM is energized, the associated armature is attracted, causing the pawl AP to engage a tooth of the ratchet wheel MR to advance it one step, the detent rising to permit the advancement and dropping into the next succeeding notch in the wheel. The arrangement is such that a single energization of the electromagnet causes the one step advancement of the ratchet wheel and the associated parts. The mechanism associated with the wage magnet WM is substantially identical, except that it serves to actuate the other individual gear IG¹ of the differential. It will be apparent that the actuations of both the wage magnet and the material magnet combine to drive the common gear CG of the differential, and since this gear is in mesh with the driving pinion DP of the register *per se*, the register will indicate the number of actuations of both electromagnets WM and MM. With this arrangement, the electromagnetic actuating mechanisms may be energized simultaneously or successively, and in every case the register will be actuated by an amount corresponding with the total. In so far as these parts of the register and its actuating mechanism are concerned, it will be seen that the wage magnet WM and the material magnet MM may be connected in circuit, as shown in Fig. 1, to actuate the associated register, as described in connection with that figure.

It will be remembered that the auxiliary magnet tc was described as coming into play to correct the otherwise error due to a complemental actuation of the register. This auxiliary magnet is shown at tc in Figs. 15 and 16. It is provided with the armature AA which actuates an auxiliary pawl XP. This pawl is adapted for engagement with the teeth of an auxiliary ratchet wheel XR, shown in dotted lines in Fig. 15 and in front elevation in Fig. 16. This auxiliary ratchet wheel XR forms a part of the numeral wheel N⁵, and is attached also to one member CL¹ of a spring clutch, whose other member CL² is attached to the carrying wheel CW⁵. It will be understood that each of the numeral wheels is adapted to actuate a carrying pinion such as CP², as shown in Fig. 15, and that the numeral wheel of next higher order is provided with a carrying wheel, these two parts coöperating to advance a numeral wheel of next higher order whenever the numeral wheel of lower order passes through its zero position. The mechanism for carrying from numeral wheel N⁴ into numeral wheel N⁵ differs from the mechanism for carrying between the numeral wheels in that the spring clutch comprising the members CL¹ and CL² is interposed between the carrying wheel CW⁵ and the numeral wheel N⁵. This spring clutch has radially serrated engaging surfaces, as shown, and the clutch spring CS forces the numeral wheels N⁵ and N⁶ to the right, thereby causing a yielding engagement between the two members of the spring clutch. Ordinarily, the engagement is of such pressure that the numeral wheel N⁴ will carry into the numeral wheel N⁵ of next higher order in the usual manner. During the ordinary operation of the register, it is as though the spring clutch and the auxiliary ratchet wheel XR were omitted altogether. The function of these parts will now be apparent, when we consider the operation for adding to the indication of the register by causing a complemental number of impulses to flow through one of the main electromagnets WM or MM. For example, we may wish to subtract from $4,000.00, the indication of the register shown in Fig. 16, the amount $18.13. For this purpose, we may set up on the keyboard the complemental number 81.87, whereupon eight thousand one hundred eighty-seven impulses will be caused to flow through one of the main electromagnets, for example, MM. This will advance the numeral wheels of the register to show $4,081.87. This is a larger amount than was indicated before the attempted subtraction began. To complete the proper showing of the register, the auxiliary actuating magnet tc is energized once, as, for example, by the closure of the auxiliary contacts of the spring jack, whereupon the pawl XP engages the ratchet wheel XR to actuate it one step in the reverse direction. It is to permit this one step actuation of the numeral wheel N⁵ without affecting the position of the numeral wheels of lower order that the spring clutch is interposed. It will be apparent that the retrograde actuation of the numeral wheel N⁵ by the pawl and ratchet mechanism XP and XR will cause the serrations of the two members of the spring clutch to slip over one another sufficiently to permit the one step actuation of the numeral wheel N⁵. In the drawing, the numeral wheel N⁵ is shown at its zero position. The one step actuation of this numeral wheel, due to the energization of the auxiliary magnet tc, will not only cause the numeral wheel N⁵ to assume its "9" position, but the carry-over mechanism will act also to return the numeral wheel N⁶ from its "4" position to the "3" position. The result, therefore, of the single energization of the auxiliary magnet tc will be to transform the reading which was $4,081.87 to $3,981.87. This, it will be obvious, is the proper arithmetical result of the subtraction of $18.13 from $4,000.00. I have described the order of the operations as, first, the advancement of the numeral wheels by the main electromagnet, and subsequently the retrograde actuation of the numeral wheel of higher order, due to the energization of the auxiliary magnet. In practice, in the circuit arrangement shown in Fig. 1, the order of the operations would be reversed, or, perhaps more accurately, the energization of the auxiliary magnet would take place almost simultaneously with the flow of the first impulse through the main electromagnet. It will be apparent, however, that the order in which these operations take place is immaterial as long as both operations take place in bringing about the final indication of the register. It is to be noted that I have shown in detail in Figs. 15 and 16 a register having six numeral wheels. It is for some purposes preferable to have the register TC equipped with the same number of numeral wheels as are the individual job registers, and I have, therefore, shown them in Fig. 1 as equipped each with five numeral wheels. The number of the numeral wheels, however, does not affect the principle of operation which I have described.

It will be understood from Figs. 15 and 16 how the register may be actuated by either of two main magnets, and, if desired, the auxiliary magnet might be omitted. In like manner, one or the other of the main magnets might be omitted. The prior total registers are of the type having but a single main electromagnet and a single auxiliary electromagnet. The actuation of the prior registers is always accomplished upon the subtraction of a corresponding amount from some current register. This subtraction is effected by subtracting the complement of the number and causing the one step actuation of the numeral wheel of next higher order. Since the subtraction of the complement in a current register must cause an addition to the indication of the prior register, I arrange the numerals in the reverse direction upon the numeral wheels of the prior registers. The flow of impulses which causes a subtraction in the final indication of the current register will cause an addition to the indication of the prior register in which the numeral wheels are reversed. It will be noted that in Figs. 15 and 16, the auxiliary magnet is arranged to actuate directly the fifth numeral wheel. It will be apparent, also, that this arrangement is intended for coöperation with registers of four numeral wheels, the "complemental number" being determined by the number of numeral wheels in the register which is, for example, to be cleared, or from which a subtraction is to be made. If the register to be cleared comprised five numeral wheels, it would then be necessary to determine the complement by subtracting the direct reading from 100000. To correspond with the use of the five digit complemental number in this case, it would be necessary to provide an auxiliary magnet adapted to actuate directly the numeral wheel of the sixth order, instead of the fifth, as shown in the drawings. It is obvious how this arrangement may be made; also, that an auxiliary actuating mechanism may be provided for two or more of the numeral wheels, if desired. This would permit the proper actuation of a totalizing or prior total register to correspond with the clearance or subtraction from the indications of registers of different numbers of numeral wheels, it being understood in this connection that in each instance an auxiliary magnet will be energized directly to actuate the numeral wheel which is of an order one higher than the highest ordered numeral wheel of the register to be cleared.

We have yet to consider the key-board mechanism which controls the operation of the interrupter switch, IS. This mechanism is illustrated in detail in Figs. 9 to 14, inclusive. In Fig. 9 is illustrated the segmental member of the switch IS and the interrupter brush IB. The commutator or rotating segment is mounted on the spindle 30, and it is the function of the key-board mechanism to control the rotation of the shaft and commutator to send out the required number of impulses in accordance with the key-board set-up.

The mechanism will, perhaps, be more clearly understood if the general plan of operation be stated at the outset. I provide a constantly rotating driving shaft which normally runs idle. The interrupter commutator may, however, be connected with this driving shaft, whereby the current impulses will be delivered from the interrupter brush. After the driving of the commutator has once been started, it will continue to run until automatically stopped by mechanism which is set by the keys of the key-board.

This automatic stopping mechanism involves a number of mechanisms which I have invented and which I call, for want of a better term, multi-ratio-differential gears. Each of these is a mechanism to which power may be supplied at one point, and which is capable of delivering or transmitting power at two points, the power being delivered into these two different channels in different ratios. The ratio which I have adopted for use in a decimally ordered key-board is a ten to one ratio. Each of the paths into which the motion may be transmitted is equipped with a mechanism for locking or stopping the channel when the motion has continued to a pre-determined extent. The keys of the key-board determine the stopping points. The result is that the motion coming from the driving shaft is delivered to the first multi-ratio-differential gear, which is driven until the one to one channel is blocked, whereupon the motion is delivered into the ten to one channel, which leads to the power receiving member of a second multi-ratio gear. Here, again, the unitary member is operated until its channel is blocked, whereupon the motion is transmitted through another ten to one channel, and so on, indefinitely. As the blocking of the various channels is ultimately controlled by the keys of the key-board, it is but necessary to set up the blocking points on the key-board, whereupon the motion will be delivered into the mechanism until all of the channels are blocked, whereupon the mechanism will stop. The rotation of the commutator is determined by the amount of motion which may be delivered into the mechanism, and therefore the commutator is driven by an amount corresponding with the key-board set-up, whereupon the mechanism stops.

With this preliminary statement, we may look to the details. The driving shaft 31 is continuously driven by a motor or other source of power. This shaft extends only to the dotted line marked 31'. Upon it is mounted the driving pinion 32. This pinion is adapted to transmit motion normally to the starting member 33 of a differential clutch, comprising also a stopping member 34. This motion is transmitted from the driving pinion 32 to the planet gear 35. Looking at Fig. 9, it will be seen that the gear 32 meshes only with the right hand end of the teeth of the gear 35. The left hand ends of the teeth of the planet gear 35 are in mesh with the right hand ends of the teeth of another planet gear 36, both of the planet gears being loosely mounted on spindles fixed to the starting member 33 and supported by the housing 33', which is screwed or otherwise fastened to the starting member 33. The left hand ends of the teeth of the planet gear 36 mesh with the transmitting pinion 37, which is secured to the commutator spindle 30. Upon this commutator spindle also is fixedly mounted the stopping member 34 of the differential clutch. Before going further, it may be pointed out that if the stopping member 34 of the differential clutch is held against rotation, then the rotation of the driving shaft 31 must cause a rotation of the starting member 33 around the shafts upon which it is loosely mounted. Assuming the driving pinion 32 to rotate in the direction indicated by the associated arrow in Fig. 10, it will be seen that the planet gear 35 will be caused to rotate in the direction indicated by its associated arrow. This planet wheel will, in turn, transmit motion to the planet wheel 36 in the direction indicated by the arrow, and this second planet wheel meshes with the transmitting pinion 37. If, now, this transmitting pinion 37 is stopped against rotation by means of the disk 34, which is mounted upon the same shaft, then the rotation of the planet gear 36 must result in causing this planet wheel to climb around the stationary gear 37, and this climbing of the planet gear 36 will cause the starting member 33, in which it is housed, to rotate with it and this in the direction indicated by the arrow 38. Normally, the commutator spindle 30 is at rest, it being held by mechanism which grips the stopping member 34 of the clutch and the result is that the starting member 33 runs idly, except when the mechanism is engaged in sending out current impulses.

It will be apparent that if the stopping member 34 is released while the starting member 33 is gripped to prevent rotation, then motion will be transmitted from the driving shaft to the commutator spindle 30, thereupon causing the rotation of the commutator and the consequent flow of current impulses. It will be apparent, from this, that there must be a means for stopping the idle rotation of the starting member 33 and for releasing the stopping member 34 to permit rotation. This checking and releasing mechanism is best illustrated in Fig. 10. The means for checking the idle rotation of the starting member 33 comprises a catch 39 rotatably mounted upon the stop shaft 40. Rigidly mounted upon the shaft 40 is a lug 41, in the end of which is mounted a pin 42 which projects into a slot 43, indicated in dotted lines in Fig. 10, this slot being cut in the metal of a stopping hook 44 which is formed integrally with the hook 39 and which is provided with a lever 45 against which the plunger of the spring-returned go key KG may be pressed. It will be apparent that the depression of the go key will, for one thing, throw the starting hook 39 into a position in which it will engage the notch 39' in the periphery of the starting disk 33, to prevent the continued rotation thereof. In the second place, the movement of the stopping member 44 which accompanies the engagement of the hook 39 with the notch 39' will also cause the withdrawal of the stopping hook 44 from the notch 44' in the periphery of the stopping disk 34 of the differential clutch. Having, therefore, depressed the go key, the idly running member of the clutch is stopped and at the same time the normally stationary member is released, whereby the motion of the driving shaft 31 is transmitted through the differential gearing to the transmitting pinion 37, and thence through the commutator spindle to the commutator 18. Having been started in this way, the commutator will run until the stopping member 34 is checked or gripped by the stopping hook 44. This stoppage of the disk 34 is automatically accomplished at the proper time, and at the same time the starting hook 34 is removed from the notch in the periphery of the starting disk, thereby permitting it to run idly as before. Associated with the go key are the contact springs KG¹ and KG², the function of which is to close the circuit of the auxiliary magnets of the registers as previously described.

We come now to a consideration of the mechanism for limiting the rotation of the commutator to send out the proper number of impulses, and no more. In order to understand this part of the mechanism, I have illustrated in Figs. 12, 13 and 14 the multi-ratio-differential gear which is an important part of the apparatus. Referring to these figures, it may be assumed that the shaft marked 30 is the end of the commutator spindle. Upon the end of this spindle is keyed a power pinion 46. This pinion meshes with a large planet gear 47 keyed to a shaft 48, to which also is keyed the small planet gear 49. This smaller planet gear meshes in turn with the power receiving gear 50, mounted at the right hand end of the transmission shaft 51. This transmission shaft leads to the left, where it terminates in another power pinion like that marked 46 in Fig. 14. In other words, there is a series of these multi-ratio differential gears, all alike, to and through which the motion is transmitted.

It will be apparent that if the transmitting gear 50 is held stationary during the rotation of the driving pinion 46, then this driving pinion rotating in the direction indicated by the associated arrows, will cause the planet wheels to rotate in the direction indicated by their arrows. This, in turn, will cause the planet pinion 49 to climb around the periphery of the stationary transmitting gear 50, thereby causing the disk wheel 52 and the associated housing 52', in which the staff 48 of the planet wheels is mounted, to rotate in the direction of the arrow 53. The disk wheel is integral with a bushing loosely mounted upon the shaft 51, and formed upon this bushing as a hub is a driving ratchet wheel 54. This driving ratchet coöperates with a pawl 55, mounted upon an idler gear 56, to transmit motion from the disk wheel 52 to the idler gear 56 and thence to the controlling gear 57 which is in mesh with the idler. The idler gear is, of course, loosely mounted upon the shaft 51. When, therefore, the transmitting gear 50 is stopped against rotation, the motion from the shaft 30 will be transmitted through the channel described, to the controlling gear 57. Mechanism subsequently to be described controls the amount of rotation of which the controlling gear 57 is capable, and therefore the amount of motion which may be transmitted from the shaft 30 through the channel just described is limited.

Without stopping now to examine the mechanism for limiting the motion of the controlling gear, let us consider the other channel which is open to receive the motion from the shaft 30 in case the channel through the controlling gear 57 is blocked. The blocking of the channel through the controlling gear will prevent the rotation of the disk 52 in the direction of the arrow 53, and the shaft 48 of the planet gears will, therefore, remain stationary in place. This being the case, the motion of the pinion 46 is transmitted through the planet wheels 47 and 49, and thence to the transmitting wheel 50, this wheel being keyed to the transmitting shaft 51. The motion of the transmitting shaft 51 will, under these circumstances, be as indicated by the arrow in Fig. 14, that is, in the same direction as the rotation of the shaft 30. Upon the left hand end of the shaft 51 is mounted another driving pinion corresponding with the pinion 46 at the left hand end of the shaft 31. This driving pinion on the shaft 51 forms a part of another multi-ratio differential gear. There is a series of these gears through and to which motion may be transmitted, as herein described. A series of four such multi-ratio gears is illustrated partly in plan and partly in cross section, in Fig. 9.

The gear ratios are such that when the disk 52 is held against rotation, ten revolutions of the shaft 30 will cause a single revolution of the shaft 51. So, also, when the shaft 51, and consequently the transmitting gear 50, are held against rotation, ten rotations of the shaft 30 are required to cause a single rotation of the disk 52, and consequently of the controlling gear 57.

We may now examine into the mechanism for controlling the degree of rotation of each of the controlling gears and consequently of the associated mechanism. Fig. 11 illustrates in cross-section the mechanism of first order, as shown in Fig. 9. Each controlling gear is loosely mounted upon a common spindle 58, and attached to or formed integrally with each controlling gear is a notched disk 59. Associated with each notched disk is a stepped setting bar 60, best shown in Fig. 11. A setting shaft 61 is provided with a series of cranks, such as 62, each of which is connected by a stiff spring, such as 63, with a lug 60' on the front of the stepped setting bar 60. A tension spring 60ª acts to return the setting bar 60 to its right hand position, as shown in the drawings, when removed therefrom by an actuation of the crank 62 in the direction of the arrow 62'. Now, when the setting bar is drawn forwardly, or toward the left, as shown in Fig. 11, a gripping rack 64, which is pivoted to the setting bar at 64', engages the teeth of a mutilated gripping gear 65, this gripping gear being formed integrally with the notched disk 59 and the controlling gear 57. The forward motion of the setting bar, therefore, causes a rotation of the disk 59 and the controlling gear 57 in the direction of the arrow 59'. The gear 57 being in mesh with the idler gear 56, causes also a rotation of this latter gear in the direction of the arrow 56', such motion being permitted by the pawl 55, which moves over the teeth of the stationary driving ratchet wheel 54.

It is the degree to which the setting bar is moved forward which controls the subsequent movement of the controlling gear 57. We must, therefore, consider the mechanism for determining the amount of motion which is given to the setting bar. The amount of this forward motion of the setting bar is determined by a series of plunger keys arranged in the order of the digits 0, 1, 2, 3, * * * 8, 9, as indicated in Fig. 11. If the spring plunger marked with number 9 is depressed until it strikes the step of the setting bar, there will be a certain distance to which the setting bar may be moved to the left before it will be stopped by engagement with the lower end of the plunger. If the plunger number 8 had been depressed, the setting bar could be moved twice as far to the left. If number 7 had been depressed, the setting bar could be moved three times as far, and so on, down to plunger No. 1, which, if depressed, would permit a nine space movement. If the plunger marked 0 were depressed, then no motion of the setting bar whatever could take place toward the left. It will be noted that there is a common detent 66 which coöperates with the conical catches on the numeral plungers to hold any one in its depressed position until some other plunger has been depressed. It is possible, therefore, to complete a set-up of the keys, one in each order, before the setting lever is actuated to draw forward all of the setting bars, each to its proper position, as determined by the depression of an associated numeral plunger. Suppose, for example, that plunger number 7 of the set shown in Fig. 11 has been depresssed, and held in position by the detent 66; at the proper time, the crank 62 swings toward the left, thereby drawing the setting bar 60 toward the left through a distance of three spaces. The result is first for the sliding cam surface 67 to engage the rider 68, and thus to swing the stop dog 69 downward and out of engagement with the notch in the periphery of the disk 59. This downward swing of the stop dog takes place in opposition to the tension of the retracting spring 70. The stop dog is loosely mounted upon the stop shaft 40, to which the crank 41 is attached, as shown in Figs. 9 and 10. In association with each of the stop dogs is a disengaging arm 71, rigidly mounted on the shaft 40, which shaft is provided with a suitable crank and tension spring 72 for causing a clockwise tendency of rotation in the shaft 40. In the face of the stop dog 69 is a disengaging pin 73 adapted to coöperate with the disengaging arm 71, whereby the depression of any stop dog on account of the forward motion of a setting bar causes a slight rotation of the shaft 40 in the direction of the arrow 40', such slight motion being permitted by the slot 43 in which the pin 42 plays (Fig. 10). Returning to the consideration of the setting bar, which has been drawn forwardly three spaces by the crank 62, it will be seen that the spring rack 64 will engage the teeth of the gripping pinion 65 to advance that pinion and the attached disk 59 and gear 57 through a distance of three spaces, it being understood that a ten space advancement would cause one complete revolution of these parts. The stop disk 59 having been advanced through an angular distance of three spaces, is in a condition where it may rotate in the direction of the arrow 59' an angular distance corresponding to seven spaces before one complete revolution will be effected, and therefore before the stop dog 69 will be drawn into the notch of the periphery of the stop disk 59 to prevent further rotation except as the stop dog may again be withdrawn from the notch by another forward movement of the setting bar. It should be understood, in this connection, that the sequence of operation is, first, to depress the numbered plunger, then to draw forward the setting bar with the consequent advancement of the controlling gear and disk 59, then to release the setting bar to permit the retracting spring 60ª to return it to the normal position shown in the drawings. During this return, the gripping rack 64 drops down against the compression of the holding springs 64ª, the teeth of the rack riding over the teeth of the gripping pinion 64 during this movement of restoration. The result is to return the setting bar to its normal position, while the notched stop disk and the associated rotating parts are left in a position three steps advanced from that of normal. It is to be noted, in this connection, that the restoration of the setting bar to its normal position brings the notch 67 directly above the rider 68, whereby the setting bar will not interfere with the return of the stop dog to its normal position. The periphery of the stop disk 59 will engage the end of the stop dog, however, to maintain it in its lower or alternate position. It is to be clearly understood that each order of numeral plungers is associated with a setting bar, a stop disk, a controlling gear, a stop dog, etc., all as shown in Fig. 11.

This being the construction of the mechanism, we may consider the operations involved in sending out any required number of impulses, for example, 713. The key-board shown in Fig. 9 is equipped with four orders of numeral plungers. Therefore, plunger number 0 in the highest order will be depressed, plunger number 7 in the next lower order, plunger number 1 in the next, and plunger number 3 in the lowest order. The plungers depressed will be maintained in their lowermost positions by the common detents 66. Thereupon, the actuating shaft 61 is rotated in the diretcion of the arrow 62', whereby all four of the setting bars are drawn forwardly until each strikes an associated numeral plunger; that is to say, the setting bar of lowest order will be drawn forwardly seven spaces and stopped by plunger number 3 of the units order. The setting bar of the tens order will be drawn forwardly nine spaces. The setting bar of the hundreds order will be drawn forwardly three spaces; while the setting bar of thousands order will be stopped in its initial position by the zero numeral plunger. The result of this movement of the various setting bars will be to depress the three stop dogs of the three lower orders, and each acting through its pin 73 and the crank 71 will tend to cause a slight rotation of the stop shaft 40. The spring 70 of the stop dog of highest order will, however, maintain this dog in engagement with the notch in the periphery of the associated stop disk. A further result of the advancement of the setting bars is to advance the units controlling gear 57 seven spaces, the tens controlling gear nine spaces, and the hundreds controlling gear three spaces. The thousands controlling gear will remain in its normal position. The advancement of the various controlling gears to correspond with the movement of the setting bars causes each pawl 55 to move over the face of the ratchet wheel 54 without causing any movement of the mechanism which is rotatably mounted concentric with the driving gear 56.

The setting of the mechanism having in this way been accomplished, the go key KG is depressed, with the result that the stop hook 44 is withdrawn from the notch 44' in the periphery of the stopping disk 34 at the same instant the notch 39' in the periphery of the starting disk 33 is engaged by the starting hook 39. It will be remembered that the movement of the starting and stopping hooks necessary for this purpose is possible because the shaft 40 and its crank 41 have been shifted slightly in a counter clockwise direction, due to the depression of the various stop dogs associated with the notched disks 59. It will be understood that the starting disk 33 has been running freely, due to the application of power through the shaft 31, until the go key is depressed. Upon the depression of this key the differential clutch, comprising the starting and stopping disks and their associated mechanism, acts to cause the driving of the shaft 30 in the direction of the associated arrow. The result of the rotation of the shaft 30 is, on account of the greater friction in the other channel, first to deliver motion into the channel leading to the controlling gear 59 of the units order. The motion may be traced through the multi-ratio-differential gear of the units order as follows: From the pinion 46 to the planet gear 47, to the planet pinion 49 which climbs on the periphery of the driving gear 50 to cause the rotation of the driving disk 52. This disk being formed integrally with the ratchet wheel 54, causes a tooth of this ratchet wheel to engage the pawl 55 on the side of the driving gear 56 of units order. This, in turn, transmits motion to the associated controlling gear 57, which causes a rotation of the associated notched disk in the direction of the arrow 59'. This motion will continue until the notch in the periphery of the disk 59 comes opposite the tooth of the stop dog 69, when, due to the pull of the spring 70, the tooth of the stop dog will be forced into the notch in the periphery of the disk 59 to prevent the further rotation of this disk. It will be remembered that the setting of the controlling gear 57 by means of the setting bar caused this gear to assume a position seven steps advanced from normal. Therefore, an additional three step advancement of this gear may be caused before the stop dog would act upon the notch in the periphery of the disk 59 to prevent its further rotation. The gear ratios are such that the three step advancement of this notched stop disk of units order requires three revolutions of the driving shaft 30, upon which is mounted the interrupter commutator IS. Three current impulses will, therefore, be delivered to and through the interrupter brush IB during the return of the notched disk 59 of units order to its initial position, in which it is stopped by the associated stop dog. The channel through the driving disk 52 of units order being thus stopped, the planet pinion 49 of units order can no longer climb on the periphery of the associated driving gear 50. The alternative action takes place. That is to say, the planet pinion 49 causes the rotation of the driving gear 50. This gear, which is keyed to the transmitting shaft which leads to the driving pinion 46 of the multi-ratio differential gear of next higher order, is caused to rotate. Here, as in the case of the mechanism of the first order, the planet gear and pinion first act to cause the rotation of the driving disk 52 until this motion is stopped by the locking of the stopping disk of tens order, due to the engagement of the tooth of the stop dog in the notch of the stopping disk. It will be remembered that the stopping disk of tens order has been advanced to its "9" step position, wherefore an advancement of but a single step will return the disk to its normal position, in which it will be stopped and locked. There is, however, a ten to one gear ratio between the shaft 30, upon which the commutator IS is mounted, and the transmitting shaft of next higher order, so that ten revolutions of the shaft 30 and the associated commutator are required to cause the one step advancement of the notched disk of tens order. The result is, therefore, that ten revolutions of the commutator will take place before the channel for motion to the disk of tens order is closed.

Now, again, as in the case of the units order, the continued motion will be transmitted not to the stopping disk of tens order, which has been locked, but rather through the alternate path of ten to one gear ratio to the stopping disk of the hundreds order. This stopping disk of the hundreds order having been advanced but three spaces, will require a further advancement of seven spaces before it is stopped by the associated stop dog. This seven space advancement of the stopping disk of hundreds order will require seven hundred revolutions of the shaft 30, and consequently of the commutator IS.

It is to be noted that when this stage has been reached, all of the stop dogs 69 will have been returned to their normal positions. The result is that all of the pins 73 will have been returned to their normal positions, and there is, therefore, nothing to retain the stop shaft 40 in its alternate position opposition to the tension of the spring 72. It follows, therefore, that the spring 72 returns the stop shaft 40 to its normal position as shown in the drawings. This slight clockwise rotation of the shaft 40, as shown in Fig. 10, will cause the pin 42 to engage the right hand end of the slot 43 and thus to return the starting and stopping hooks 44 and 39 to their normal position, as shown in the drawing. The stopping hook 44 will, of course, ride on the periphery of the stopping disk 34 until the notch 44' comes opposite the hook 44, when the hook will drop into the notch to stop the further rotation of the driving shaft 30 and the mechanism connected therewith. At the same time the starting hook 39 is withdrawn from the notch in the periphery of the starting disk 33, whereupon this disk of the differential clutch is permitted to run idly as before the actuation of the commutator was commenced.

While I have explained the operation of the multi-ratio-differential gears in a certain order, that is, first the driving of the disk 52 and subsequently the driving of the transmitting shaft from the gear 50, it will be understood that the balance of friction may cause the operation to take place in the reverse order, or, in fact, both channels being open at once, the motion may be transmitted into both at the same time. The result is, however, the same in any case, namely, three revolutions of the commutator will be required to bring the units stopping disk to its normal position. Ten additional revolutions will be required to bring the stopping disk of the tens order to its initial position, and seven hundred additional revolutions will be required to bring the stopping disk of the hundreds order to its initial position. The total number is, therefore, seven hundred thirteen, and consequently seven hundred thirteen impulses will be sent out to correspond with the set-up on the keyboard.

It may be desirable to point out that the final transmitting shaft leading to the left from the multi-ratio-differential gear of highest order is fixed in position by a pin 74 passing through the frame, as shown in Fig. 9. If this transmitting shaft were not fixed, the result of the operation of the mechanism might be to cause it to run idly without causing the actuation, or at least the proper actuation, of the stopping disks and their associated mechanism. It will be apparent that the number of multi-ratio gears and stopping disks may be extended as necessary to accommodate figures having any number of digits.

It will be understood generally, therefore, that the key-board mechanism may be set to cause any desired number of current impulses to be sent out by the interrupter commutator. The sending of these impulses is intended for such purposes as were previously described, and for many others in connection with the operation of the accounting mechanism.

Since I have endeavored throughout the specification to explain the purpose of the various operations, it will, I think, be unnecessary to recapitulate here. It may be well to add that I do not wish to be limited to the precise forms which I have described and illustrated. Many modifications will occur to those skilled in the art.

What I claim as new and desire to secure by Letters Patent is:

1. In a device of the class described, the combination of a source of current, a plurality of branch circuits, a motor driven switch in each circuit for maintaining the closure of the associated circuit during certain periods and maintaining the open condition of the circuit during other pre-determined periods, a wage brush or switch common to all of said branch circuits and adapted during every period to establish connection with said source of current, a plurality of electromagnetically actuated wage registers each adapted for connection with any of said branch circuits, and a switch for completing the circuit of said registers successively one at a time.

2. In a device of the class described, the combination of a source of current, a plurality of branch circuits, a motor driven switch in each circuit for maintaining the closure of the associated circuit during certain periods and maintaining the open condition of the circuit during other pre-determined periods, the cycle of openings and closures being different in the different switches, a wage brush or switch common to all of said branch circuits and adapted during every period to establish connection with said source of current, a plurality of electromagnetically actuated wage registers each adapted for connection with any of said branch circuits, and a switch for completing the circuit of said registers successively one at a time.

3. In a device of the class described, the combination of a source of current, a plurality of branch circuits, a series of spring jacks connected with each branch circuit, a motor driven switch in each circuit for maintaining the closure of the associated circuit during certain periods and maintaining the open condition of the circuit during other predetermined periods, a wage brush or switch common to all of said branch circuits and adapted during every period to establish connection with said source of current, a plurality of electromagnetically actuated wage registers each adapted for connection with the spring jacks connected with any of said branch circuits, and a switch for completing the circuit of said registers successively one at a time.

4. In a device of the class described, the combination of a source of current, a plurality of branch circuits, a series of spring jacks connected with each branch circuit, a motor driven switch in each circuit for maintaining the closure of the associated circuit during certain periods and maintaining the open condition of the circuit during other predetermined periods, a wage brush or switch common to all of said branch circuits and adapted during every period to establish connection with said source of current, a plurality of electromagnetically actuated wage registers each adapted for connection with the spring jacks connected with any of said branch circuits, a switch for completing the circuit of said registers successively one at a time, and an auxiliary set of spring jacks connected with each branch circuit but located in proximity to the main spring jacks associated with another branch circuit.

5. In a device of the class described, the combination of a source of current, an electrical circuit connected with said source, a switch in said circuit, an electric motor for actuating the switch, a power circuit for the motor, a switch for closing the power circuit, means driven by the motor for opening the switch in the power circuit after a predetermined amount of operation of said motor, and clock controlling mechanism for closing the switch in the power circuit at predetermined intervals of time.

6. In a device of the class described, the combination with a plurality of registers, of mechanism for electrically actuating any register connected therewith, means for connecting any register at will with the actuating mechanism, and clock controlled governing mechanism for automatically rendering said actuating mechanism operative and inoperative at predetermined hours.

7. In combination, a plurality of registers, a uniformly driven common actuating mechanism therefor, means for connecting any register at will with the actuating mechanism, a resetting device comprising a keyboard, a mechanism controlled by the keyboard to determine the degree of actuation of the resetting device, and means for operatively connecting any register with said resetting device.

8. In a device of the class described, the combination of a plurality of registers, a common actuating mechanism therefor, clock driven mechanism for driving the actuating mechanism, means for connecting any register with the actuating mechanism during any desired period of time, an auxiliary actuating mechanism, a key-board for controlling the operation of the auxiliary actuating mechanism, and means for connecting any of said registers with the auxiliary actuating mechanism.

9. In a device of the class described, the combination of a plurality of individual registers, a common actuating mechanism, clock controlled driving mechanism for operating the actuating mechanism, one or more totalizing registers, means for automatically actuating a totalizing register when any of the individual registers is actuated, an auxiliary actuating mechanism, a key-board for controlling the operation of the auxiliary actuating mechanism, and means for establishing connections between the auxiliary actuating mechanism and said registers.

10. In a device of the class described, the combination with a plurality of individual registers, of a totalizing register, an actuating mechanism, means for connecting directly any individual register with said actuating mechanism, means for simultaneously connecting said totalizing register reversely with said actuating mechanism, and automatic means for counter-actuating one step the numeral wheel of the totalizing register that is one order higher than the numeral wheel of highest order of the individual registers.

11. In combination, a register comprising suitably ordered numeral wheels and carry over mechanism therefor, a differential gear whose common gear is connected with the register, an electromagnetic actuating device associated with each of the driving gears of the differential gear, a friction clutch interposed between certain numeral wheels of the register, and auxiliary electromagnetic mechanism for directly actuating the numeral wheel to one side of said friction clutch.

12. In a rate controlling switch, the combination of a common spindle, a plurality of notched rate controlling disks mounted thereon, means for causing the step by step advancement of said spindle, and an electrical switch associated with each of said disks and each adapted to be actuated by the associated disk to close a circuit independent of said disk.

13. In a device for sending current impulses, the combination with a commutator, mechanism for driving the commutator, suitably ordered mechanism for automatically permitting a desired number of rotations of the commutator, and a key-board for setting the rotation limiting mechanism.

14. The combination of a source of electrical impulses of predetermined frequency, a register adapted to be connected in circuit with said source to be actuated every time an impulse is sent through the circuit, a pair of normally open contacts in said circuit, and an intermittently rotatable disk associated with said contacts to control the length of time for which said contacts remain closed during one revolution of said disk, whereby said disk controls the number of impulses passing through the register from said source in a given period and thus determines the rate of actuation of the register.

15. The combination of a source of electrical impulses of predetermined frequency, a plurality of registers adapted to be connected in circuit with said source to be actuated every time an impulse is sent through the circuit, a selector-mechanism for connecting said registers with said source one after the other, a pair of contacts in the circuit of each register, a time-controlled shaft, and a plurality of disks mounted thereon to rotate therewith, there being a disk associated with each pair of contacts for controlling the opening and closing thereof to regulate the number of impulses passing through the corresponding register during every revolution of said shaft, whereby said disks determine the rate of actuation of said registers.

16. The combination of a source of electrical impulses of predetermined frequency, a plurality of registers adapted to be connected in circuit with said source to be actuated every time an impulse is sent through the circuit, a selector-mechanism for connecting said registers with said source one after the other, a pair of relatively movable contacts in the circuit of each register, a time-controlled shaft, and a plurality of disks mounted thereon to rotate therewith, there being a disk associated with each pair of contacts to control the length of time for which said contacts remain closed during every revolution of said shaft, whereby each disk controls the number of impulses passing through the corresponding register from said source in a predetermined period and thus controls the rate of actuation of that register.

17. In a device of the class described, the combination of a workman's wage-register, a source of electrical impulses for actuating said register, normally open circuit connections between said register and said source of impulses, and a time-controlled device for closing said circuit connections for every increment of one cent in wages in accordance with the workman's rate, whereby the number of impulses sent through the register in a given period will equal the number of cents which the workman has earned during that period.

18. In a device of the class described, the combination with a workman's register, of automatic means for actuating the same by a one-step advancement every time the workman has earned one cent in wages in accordance with a predetermined rate.

19. In a device of the class described, the combination with a plurality of workman's wage-registers, of automatic means for actuating each register by a one-step advancement every time the workman to whom the register belongs has earned one cent in wages in accordance with his particular rate.

20. In a device of the class described, the combination of a source of electrical impulses, a plurality of wage-registers adapted each to be connected in circuit with said source to be actuated by a one-step advancement every time an impulse is sent through the circuit, a selector-mechanism for connecting said registers with said source one after the other, a pair of contacts in the circuit of each register, a disk associated with each pair of contacts for controlling the opening and closing thereof to regulate the number of impulses passing through the corresponding register in a given period, whereby each disk determines the rate of actuation of the registers in the circuit controlled by that disk, a shaft upon which said disks are mounted to rotate therewith, and means for rotating said shaft at a speed such that each register will have an impulse sent therethrough every time the workman to whom the register belongs has earned one cent in wages in accordance with his particular rate.

21. The combination of a source of electrical impulses of predetermined frequency, a register adapted to be connected in circuit with said source to be actuated every time an impulse is sent through the circuit, a pair of contacts in said circuit, one of said contacts being fixed while the other is movable and normally tends to separate from said fixed contact, a rotatable time-controlled disk associated with said movable contact and having a series of recesses in the periphery thereof, and an actuating member between said movable contact and the periphery of said disk for causing separation of the contacts whenever said actuating member encounters a recess as the disk revolves, said actuating member holding the contacts together during the time that it engages the unbroken surface of the periphery, whereby the number of recesses in said disk controls the number of impulses passing through the register from said source during every revolution of the disk.

22. The combination of a source of electrical impulses of predetermined frequency, a plurality of registers adapted to be connected in circuit with said source to be actuated every time an impulse is sent through the circuit, a selector-mechanism for connecting said registers with said sources one after the other, a pair of contacts in the circuit of each register, one of said contacts being fixed while the other is movable and normally tends to separate from said fixed contact, a constantly rotatable shaft, a plurality of disks fixedly mounted thereon, there being a disk associated with each pair of contacts, each of said disks having a series of recesses in the periphery thereof, and an actuating member between each movable contact and the periphery of the associated disk for causing separation of the contacts whenever said actuating member encounters a recess as the disk revolves, said actuating member holding the contacts together during the time that it engages the unbroken periphery, whereby the number of recesses in any one disk controls the number of impulses passing from said source during every revolution of said shaft through the register or registers whose circuit-contacts are controlled by that disk.

23. In a device of the kind described, a rate-controlling mechanism for wage-registers comprising, in combination, a rotatable shaft, a plurality of rate-disks firmly mounted thereon side by side and suitably spaced apart, the periphery of each disk being provided with a series of recesses, a pair of circuit-contacts associated with each disk and adapted to be included in the circuit of the registers whose rate of actuation is controlled by that disk, one of said contacts being movable and normally tending to separate from the fixed contact, and a member connected with each movable contact and arranged to ride over the periphery of the associated disk as the shaft revolves for causing the separation of the contacts whenever the member encounters a recess, each member holding the associated contacts together during the time that it engages the unbroken surface of the periphery of the disk, whereby the number of recesses in any one disk controls the number of impulses that pass from a suitable source of electrical impulses during every revolution of said shaft through the register or registers whose circuit contacts are controlled by that disk.

24. As a means for actuating a wage-register in accordance with a rate expressed in cents per hour and involving a fraction, the combination of a source of electrical impulses for actuating the register by a one-step advancement every time an impulse is sent therethrough, normally open circuit-connections between said register and said source, and a cyclically operating rate-controlling mechanism for closing said circuit-connections for every increment of one cent in the workman's wages, whereby the number of impulses sent through the register during every cycle of operation of the rate-controlling mechanism will equal the number of cents which the workman has earned during that period, the cycle of operation of said mechanism being $n$ hours, where $n$ represents the denominator of the fractional part of the rate.

25. In a device of the class described, the combination of a source of electrical impulses, a plurality of wage-registers adapted each to be connected in circuit with said source to be actuated by a one-step advancement every time an impulse is sent through the circuit, a selector-mechanism for connecting said registers with said source one after the other, a pair of contacts in the circuit of each register, a disk associated with each pair of contacts for controlling the opening and closing thereof to regulate the number of impulses passing through the corresponding register in a predetermined period in accordance with the workman's rate of wages as expressed in cents per hour irrespective of whether or not the workman's rate involves a fraction, there being an impulse sent through the register every time a workman to whom the register belongs has earned one cent, a shaft upon which said disks are mounted to rotate therewith, and means for causing said shaft to make one revolution every $n$ hours, where $n$ represents the common denominator of the fractions occurring in the fractional rates involved.

26. In a device of the class described, the combination with a plurality of workman's wage-registers, of automatic means for actuating each register by a one-step advancement every time the workman to whom the register is assigned has earned one cent in wages in accordance with his particular rate as expressed in cents per hour, irrespective of whether or not such rate involves a fraction, said automatic means including a cyclically operating rate-controlling mechanism completing one cycle of operation every $n$ hours, where $n$ represents the common denominator of the fractions occurring in the fractional rates involved.

27. In a device of the class described, the combination of a source of electrical impulses, a plurality of wage-registers adapted each to be connected in circuit with said source to be actuated every time an impulse is sent through the circuit, a selector-mechanism comprising a contact-arm and a series of segments connected each in the circuit of one of the registers, means for causing relative rotation between said contact-arm and said segments to connect the registers with said source one after the other, a controlling mechanism comprising a plurality of rate-disks and coöperating contacts included in the register-circuits, said contacts being controlled by said disks, means for intermittently actuating said disks in unison by a one-step advancement to control the associated contacts, whereby said disks control the number of impulses passing through any one register from said source during every revolution of the disks, and means for preventing the closure of any register-circuit by said selector-mechanism during the interval that the disks are advanced.

28. In a device of the class described, the combination of a source of electrical impulses, a plurality of wage-registers adapted each to be connected in circuit with said source to be actuated every time an impulse is sent through the circuit, a selector-mechanism comprising a contact-arm and a series of segments connected each in the circuit of one of the registers, a source of mechanical power, transmission-connections between said source and said selector-mechanism for causing relative rotation between said contact arm and said segments to connect the registers with said source one after the other, a rate-controlling mechanism comprising a plurality of rate-disks and coöperating contacts included in the register-circuits, said contacts being controlled by said disks, transmission-connections between said source of mechanical power and said disks for intermittently actuating said disks in unison by a one-step advancement to control the associated contacts, whereby said disks control the number of impulses passing through any one register from said source during every revolution of said disks, and means for holding said disks stationary during the interval that the registers are included in circuit by said selector-mechanism.

29. In a device of the class described, the combination of a source of electrical impulses, a plurality of wage-registers adapted each to be connected in circuit with said source to be actuated every time an impulse is sent through the circuit, a selector-mechanism comprising a movable contact-arm and a series of stationary segments connected each in the circuit of one of the registers, there being as many connected segments as there are registers, a rotatable shaft on which said contact-arm is mounted to bring the same into contact with the segments successively for connecting the registers and said source one after the other, a rate-controlling mechanism comprising a plurality of rate-disks and coöperating contacts included in the register-circuits, said contacts being controlled by said disks, whereby said disks control the number of impulses passing through any one register from said source during every revolution of said disks, a rotatable shaft on which said disks are fixedly mounted, and transmission-means between the selector-shaft and the disk-shaft for intermittently actuating the latter by a one-step advancement during an interval in which the selector-arm remains out of contact with the segments.

30. In a device of the class described, the combination of a source of electrical impulses, a plurality of wage-registers adapted each to be connected in circuit with said source to be actuated every time an impulse is sent through the circuit, a selector-mechanism comprising a movable contact-arm and a series of stationary segments connected each in the circuit of one of the registers, there being as many connected segments as there are registers, a rotatable shaft on which said contact-arm is mounted to bring the same into contact with the segments successively for connecting the registers with said source one after the other, a rate-controlling mechanism comprising a plurality of rate-disks and coöperating contacts included in the register-circuits, said contacts being controlled by said disks, and means for intermittently actuating said disks in unison by a one-step advancement to cause said disks to control the associated contacts in accordance with the rate which each disk represents, said disks being held stationary during the interval that the registers are included in circuit by said selector mechanism.

31. In a device of the class described, the combination of a source of electrical impulses, a plurality of wage-registers adapted each to be connected in circuit with said source to be actuated every time an impulse is sent through the circuit, a selector-mechanism comprising a contact-arm and a series of segments connected each in the circuit of one of the registers, means for causing relative rotation between said contact-arm and said segments to connect the registers with said source one after the other, a controlling mechanism comprising a plurality of rate-disks and coöperating contacts included in the register-circuits, said contacts being controlled by said disks, and means for intermittently actuating said disks in unison by a one-step advancement to control the associated contacts, whereby said disks control the number of impulses passing through any one register from said source during every revolution of the disks, the disks thus controlling the rates of actuation of the registers.

32. In a device of the class described, the combination of a source of electrical impulses, a plurality of wage-registers adapted each to be connected in circuit with said source to be actuated every time an impulse is sent through the circuit, a selector-mechanism comprising a movable contact-arm and a series of stationary segments connected each in the circuit of one of the registers, there being as many connected segments as there are registers, a rotatable shaft on which said contact-arm is mounted to bring the same into contact with the segments successively for connecting the registers with said source one after the other, a rate-controlling mechanism comprising a plurality of rate-disks and coöperating contacts included in the register-circuits, said contacts being controlled by said disks, a rotatable shaft on which said disks are fixedly mounted, and means for intermittently actuating said disk-shaft by a one step advancement, whereby said disks control the number of impulses passing through any one register from said source during every revolution of the disk-shaft, said disks thus controlling the rates of actuation of the registers.

33. In a device of the class described, the combination of a source of electrical impulses, a plurality of wage-registers adapted each to be connected in circuit with said source to be actuated every time an impulse is sent through the circuit, a selector-mechanism comprising a contact-arm and a series of segments connected each in the circuit of one of the registers, means for causing relative relation between said contact-arm and said segments to connect the registers with said source one after the other, a pair of contacts in the circuit of each register, one of said contacts being fixed while the other is movable and normally tends to separate from said fixed contact, an intermittently rotatable shaft, a plurality of disks fixedly mounted thereon, there being a disk associated with each pair of contacts, each of said disks having a series of recesses in the periphery thereof, an actuating member between each movable contact and the periphery of the associated disk for causing separation of the contacts whenever said actuating member encounters a recess as the disk revolves, said actuating member holding the contacts together during the time that it engages the unbroken periphery, whereby the number of recesses in any one disk controls the number of impulses passing from said source during every revolution of said shaft through the register or registers whose circuit-contacts are controlled by that disk, and means for preventing the closure of any register-circuit by said selector-mechanism during the interval that the disks are advanced.

34. In a device of the class described, the combination of a source of electrical impulses, a plurality of wage-registers adapted each to be connected in circuit with said source to be actuated every time an impulse is sent through the circuit, a selector-mechanism comprising a movable contact-arm and a series of stationary segments connected each in the circuit of one of the registers, there being as many connected segments as there are registers, a rotatable shaft on which said contact-arm is mounted to bring the same into contact with the segments successively for connecting the registers with said source one after the other, a pair of contacts in the circuit of each register, one of said contacts being fixed while the other is movable and normally tends to separate from said fixed contact, an intermittently rotatable shaft, a plurality of disks fixedly mounted thereon, there being a disk associated with each pair of contacts, each of said disks having a series of recesses in the periphery thereof, an actuating member between each movable contact and the periphery of the associated disk for causing separation of the contacts whenever said actuating member encounters a recess as the disk revolves, said actuating member holding the contacts together during the time that it engages the unbroken periphery, whereby the number of recesses in any one disk controls the number of impulses passing from said source during every revolution of said shaft through the register or registers whose circuit-contacts are controlled by that disk, and transmission-means between the selector-shaft and the disk-shaft for intermittently actuating the latter by a one-step advancement during an interval in which the selector-arm remains out of contact with the segments.

35. In a device of the class described, the combination of a source of current, a plurality of circuits leading therefrom, a register adapted to be included in each circuit and actuated by the current impulses passing therethrough, and a switch common to all of said circuits for periodically connecting the same with said source, whereby the circuits for all of the registers are simultaneously made and broken by said switch.

36. In a device of the class described, the combination of a source of current, a plurality of circuits leading therefrom, a register adapted to be included in each circuit and actuated by the current impulses passing therethrough, a rate-switch in each circuit for controlling the number of impulses passing through the associated register in a predetermined period, a switch common to all of said circuits for periodically connecting the same with said source, whereby the circuits for all of the registers are made and broken by said switch, and a selector-switch for completing the circuits of said registers successively one at a time.

37. In a device of the class described, the combination of a source of current, a plurality of circuits leading therefrom, a wage-register and a job-register adapted to be included in each circuit to be actuated by the current impulses passing therethrough, a rate-switch in each circuit for controlling the number of impulses passing through the associated wage-register and job-register in a predetermined period, a switch common to all such circuits for periodically connecting the same with said source, whereby the circuits for all of the registers are made and broken by said switch, and selector-mechanism for completing the circuits of the wage-registers and their corresponding job-registers successively one at a time.

38. In a device of the class described, the combination of a source of electrical impulses, a plurality of circuits leading therefrom, a series of spring-jacks connected with each circuit, an intermittently actuated switch in each circuit for controlling the number of impulses passing through the circuit in a predetermined period, a plurality of wage-registers adapted to be connected with the spring-jacks of any of said circuits to be actuated every time an impulse passes through the proper circuit, a plug for each register adapted to be inserted in any one of said spring-jacks, whereby the proper plug-connection determines the desired rate of actuation of the corresponding register, and a selector-switch for completing the register-circuits one at a time.

39. In a device of the class described, the combination of a source of electrical impulses, a plurality of circuits leading therefrom, a series of spring jacks connected with each circuit, an intermittently actuated switch in each circuit for controlling the number of impulses passing through the circuit in a predetermined period, a plurality of wage-registers adapted to be connected with the spring-jacks of any of said circuits to be actuated every time an impulse passes through the proper circuit, a plug for each register adapted to be inserted in any one of said spring-jacks, whereby the proper plug-connection determines the desired rate of actuation of the corresponding register, a selector-switch for completing the register-circuits one at a time, and an additional series of spring-jacks connected with each circuit and located in proximity to the main spring-jacks of a circuit operating at a higher rate.

40. In a device of the class described, the combination of a source of electrical impulses, a plurality of circuits leading therefrom, a series of spring-jacks connected with each circuit, a plurality of wage-registers adapted to be connected with the spring-jacks of any of said circuits to be actuated every time an impulse passes through the proper circuit, a pair of relatively movable contacts in the circuit of each register, a time-controlled shaft, a plurality of disks mounted thereon to rotate therewith, there being a disk associated with each pair of contacts to control the length of time for which said contacts remain closed during every revolution of said shaft, whereby each disk controls the number of impulses passing through the corresponding register from said source in a predetermined period and thus controls the rate of actuation of that register, a plug for each register adapted to be inserted in any one of said spring-jacks, whereby the proper plug-connection determines the desired rate of actuation of the corresponding register, and a selector-switch for completing the register-circuits successively one at a time.

41. In a device of the class described, the combination of a source of electrical impulses, a plurality of circuits leading therefrom, a series of spring-jacks connected with each circuit, a plurality of wage-registers adapted to be connected with the spring-jacks of any of said circuits to be actuated every time an impulse passes through the proper circuit, a pair of relatively movable contacts in the circuit of each register, a time-controlled shaft, a plurality of disks mounted thereon to rotate therewith, there being a disk associated with each pair of contacts to control the length of time for which said contacts remain closed during every revolution of said shaft, whereby each disk controls the number of impulses passing through the corresponding register from said source in a predetermined period and thus controls the rate of actuation of that register, a plug for each register adapted to be inserted in any one of said spring-jacks, whereby the proper plug-connection determines the desired rate of actuation of the corresponding register, a selector-switch for completing the register-circuits successively one at a time, and an additional series of spring-jacks connected with each circuit and located in proximity to the main spring-jacks of a circuit operating at a higher rate.

42. In a device of the class described, the combination of a source of current, a plurality of circuits leading therefrom, a series of spring-jacks connected with each circuit, a plurality of wage-registers adapted to be connected with the spring-jacks of any of said circuits to be actuated every time an impulse passes through the proper circuit, a pair of relatively movable contacts in the circuit of each register, a time-controlled shaft, a plurality of disks mounted thereon to rotate therewith, there being a disk associated with each pair of contacts to control the length of time for which said contacts remain closed during every revolution of said shaft, whereby each disk controls the number of impulses passing through the corresponding register from said source in a predetermined period and thus controls the rate of actuation of that register, a plug for each register adapted to be inserted in any one of said spring-jacks, whereby the proper plug-connection determines the desired rate of actuation of the corresponding register, a selector-switch for completing the register-circuits successively one at a time, and a switch common to all of said circuits for periodically connecting the same with said source, whereby the circuits for all of the registers are made and broken by said switch.

43. In a device of the class described, the combination of a source of current, a plurality of circuits leading therefrom, a series of spring-jacks connected with each circuit, a plurality of wage-registers adapted to be connected with the spring-jacks of any of said circuits to be actuated every time an impulse passes through the proper circuit, a pair of relatively movable contacts in the circuit of each register, a time-controlled shaft, a plurality of disks mounted thereon to rotate therewith, there being a disk associated with each pair of contacts to control the length of time for which said contacts remain closed during every revolution of said shaft, whereby each disk controls the number of impulses passing through the corresponding register from said source in a predetermined period and thus controls the rate of actuation of that register, a plug for each register adapted to be inserted in any one of said spring-jacks, whereby the proper plug-connection determines the desired rate of actuation of the corresponding register, a selector-switch for completing the register-circuits successively one at a time, a switch common to all of said circuits for periodically connecting the same with said source, whereby the circuits for all of the registers are made and broken by said switch, and an additional series of spring-jacks connected with each circuit and located in proximity to the main spring-jacks of a circuit operating at a higher rate.

44. In a device of the class described, the combination of a source of electrical impulses, a plurality of circuits leading therefrom, a series of spring-jacks connected with each circuit, a plurality of wage-registers adapted to be connected with the spring-jacks of any of said circuits to be actuated every time an impulse passes through the proper circuit, a pair of contacts in the circuit of each register, a disk associated with each pair of contacts for controlling the opening and closing thereof to regulate the number of impulses passing through the corresponding register in a given period, whereby each disk determines the rate of actuation of the registers in the circuit controlled by that disk, a shaft upon which said disks are mounted to rotate therewith, means for rotating said shaft at a speed such that each register will have an impulse sent therethrough every time the workman to whom the register belongs has earned one cent in wages in accordance with his particular rate, a plug for each register adapted to be inserted in any one of said spring-jacks, whereby the proper plug-connection determines the desired rate of actuation of the corresponding register, and a selector-switch for completing the register-circuits successively one at a time.

45. In a device of the class described, the combination of a source of electrical impulses, a plurality of circuits leading therefrom, a series of spring-jacks connected with each circuit, a plurality of wage-registers adapted to be connected with the spring-jacks of any of said circuits to be actuated every time an impulse passes through the proper circuit, a pair of contacts in the circuit of each register, a disk associated with each pair of contacts for controlling the opening and closing thereof to regulate the number of impulses passing through the corresponding register in a given period, whereby each disk determines the rate of actuation of the registers in the circuit controlled by that disk, a shaft upon which said disks are mounted to rotate therewith, means for rotating said shaft at a speed such that each register will have an impulse sent therethrough every time the workman to whom the register is assigned has earned one cent in wages in accordance with his particular rate, a plug for each register adapted to be inserted in any one of said spring-jacks, whereby the proper plug-connection determines the desired rate of actuation of the corresponding register, a selector-switch for completing the register-circuits successively one at a time, and an additional series of spring jacks connected with each circuit and located in proximity to the main spring-jacks of a circuit operating at a higher speed.

46. In a device of the class described, the combination of a source of current, a plurality of circuits leading therefrom, a series of spring-jacks connected with each circuit, a plurality of wage-registers adapted to be connected with the spring-jacks of any of said circuits to be actuated every time an impulse passes through the proper circuit, a pair of contacts in the circuit of each register, one of said contacts being fixed while the other is movable and normally tends to separate from said fixed contact, an intermittently rotatable shaft, a plurality of disks fixedly mounted thereon, there being a disk associated with each pair of contacts, each of said disks having a series of recesses in the periphery thereof, an actuating member between each movable contact and the periphery of the associated disk for causing separation of the contacts whenever said actuating member encounters a recess as the disk revolves, said actuating member holding the contacts together during the time that it engages the unbroken periphery, whereby the number of recesses in any one disk controls the number of impulses passing from said source during every revolution of said shaft through the register or registers whose circuit-contacts are controlled by that disk, a plug for each register adapted to be inserted in any one of said spring-jacks, whereby the proper plug-connection determines the desired rate of actuation of the corresponding register, a switch common to all of said circuits for periodically connecting the same with said source, whereby the circuits for all of the registers are made and broken by said switch, and a selector-switch for completing the register circuits successively one at a time.

47. The combination of an electric motor, a power-circuit therefor, a normally open switch in said circuit including a movable arm and a stationary contact, an electromagnet for actuating said arm into closed position, a clock-controlled switch for periodically closing the circuit of said electromagnet, and a rotatable member driven by the motor for periodically opening the switch in the motor-circuit, whereby the actuations of said rotatable member become clock-controlled.

48. The combination of an electric motor, a power-circuit therefor, a normally open switch in said circuit including a pivoted arm and a stationary contact, an electromagnet for actuating said arm into closed position, a clock-controlled switch for periodically closing the circuit of said electromagnet, a rotatable shaft, a cam fixedly mounted thereon in association with said switch-arm for periodically causing the latter to move into open position to break the motor-circuit, and transmission-connections for operating said shaft from said motor, whereby the actuations of said shaft become clock-controlled.

49. The combination of an electric motor, a power-circuit therefor, a switch in said circuit including a stationary contact and a pivoted arm to engage said contact when moved into closed position, means tending to hold said arm in open position, an electromagnet for moving said arm into closed position, a clock-controlled switch for periodically closing the circuit of said electromagnet, a rotatable shaft, a cam fixedly mounted thereon to engage said arm for holding the same in a closed position during one complete revolution of said shaft, said cam being provided with a recess into which the adjacent portion of the arm drops at the end of every revolution of the shaft to open the motor-circuit, and transmission-connections for operating said shaft from said motor, whereby the actuations of said shaft become clock-controlled.

50. The combination of an electric motor, a power-circuit therefor, a switch in said circuit including a pair of stationary contacts and a pivoted arm arranged to engage said contacts successively when moved into its final closed position, a resistance connecting said contacts together, means tending to hold said arm in open position, an electromagnet for moving said arm into engagement with the first of said contacts, whereby the motor circuit is closed through said resistance, a clock-controlled switch for closing the circuit through said electromagnet at the beginning of predetermined periods and opening said circuit before the end of a period, a shaft arranged to be actuated by said motor, a cam fixed upon said shaft to engage said switch-arm and move the same against the second contact as the shaft revolves, whereby the resistance is cut out of the motor-circuit to increase the speed of the motor, said arm being held in its final closed position during one complete revolution of said shaft, a recess provided on said cam for receiving the adjacent portion of said arm at the end of every revolution of the shaft to open the motor-circuit, and transmission-connections between said motor and said shaft for causing the latter to make one complete revolution during every one of said predetermined periods, whereby the actuations of said shaft become clock-controlled.

51. The combination of an electric motor, a power-circuit therefor, a switch in said circuit, clock-controlled means for closing said switch at the beginning of predetermined periods, means actuated by the motor for opening said switch at the end of every period or slightly before, and means for varying the length of said periods.

52. The combination of an electric motor, a power-circuit therefor, a normally open switch in said circuit including a movable arm and a stationary contact, an electromagnet for actuating said arm into closed position, a clock-controlled switch for closing the circuit of said electromagnet at the beginning of predetermined periods, a rotatable member driven by the motor for opening the motor circuit at the end of every period or slightly before, the connections between said rotatable member and said motor being such that the motor circuit is broken at the end of every revolution of said rotatable member, whereby the actuations of said rotatable member become clock-controlled, a regulating switch in the circuit of said electromagnet, a second regulating switch in the motor circuit, and means for operating said switches simultaneously to vary the length of said periods.

53. The combination of an electric motor, a power-circuit therefor, a normally open switch in said circuit including a pivoted arm and a stationary contact, an electromagnet for actuating said arm into closed position, a clock-controlled switch for closing the circuit of said electromagnet at the beginning of predetermined periods, a rotatable shaft, a cam fixedly mounted thereon in association with said switch-arm for moving the latter into open position to break the motor-circuit, transmission-connections between said shaft and said motor for causing the shaft to make one complete revolution every time the cam opens the motor-circuit, whereby the actuations of said shaft become clock-controlled, a regulating switch in the circuit of said electromagnet, a second regulating switch in the motor circuit, and means for operating the regulating switches simultaneously to vary the length of said periods.

54. The combination of an electric motor, a power-circuit therefor, a switch in said circuit including a stationary contact and a pivoted arm to engage the same when moved into closed position, means tending to hold said arm in open position, an electromagnet for moving said arm into closed position, a clock-controlled switch for closing the circuit of said electromagnet at the beginning of predetermined periods, a rotatable shaft, a cam fixedly mounted thereon to hold said arm in a closed position during one complete revolution of said shaft, a recess provided on said cam for receiving the adjacent portion of said arm at the end of every revolution of the shaft to open the motor-circuit, transmission connections between said motor and said shaft for causing the latter to make one complete revolution during one of said predetermined periods, whereby the actuations of said shaft become clock-controlled, a regulating switch in the circuit of said electromagnet, a second regulating switch in the motor-circuit, and means for operating said switches simultaneously to vary the length of said periods.

55. The combination of an electric motor, a power-shaft therefor, a switch in said circuit including a pair of stationary contacts and a pivoted arm arranged to engage said contacts successively when moved into its final closed position, a resistance connecting said contacts together, means tending to hold said arm in open position, an electromagnet for moving said arm into engagement with the first of said contacts, whereby the motor-circuit is closed through said resistance, a clock-controlled switch for closing the circuit through said electromagnet at the beginning of predetermined periods and opening said circuit before the end of a period, a shaft arranged to be actuated by said motor, a cam fixed upon said shaft to engage said switch-arm and move the same against the second contact as the shaft revolves, whereby the resistance is cut out of the motor-circuit to increase the speed of the motor, said arm being held in its final closed position during one complete revolution of said shaft, a recess provided on said cam for receiving the adjacent portion of said arm at the end of every revolution of the shaft to open the motor-circuit, transmission-connections between said motor and said shaft for causing the latter to make one complete revolution during every one of said predetermined periods, whereby the actuations of said shaft became clock-controlled, a regulating switch in the circuit of said electromagnet, a second regulating switch in the motor circuit, and means for operating said switches simultaneously to vary the length of said periods.

56. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, transmission-connections between said motor and said shaft, and means for clock-controlling the operation of said motor, whereby said rate-controlling mechanism becomes clock-controlled.

57. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a normally open switch in the motor circuit, an electromagnet for actuating said switch into closed position, a clock-controlled switch for closing the circuit of said electromagnet at the beginning of predetermined periods, means mounted on said shaft for opening the switch in said motor circuit at the end of every revolution of said shaft, and transmission-connections between said motor and said shaft for causing the shaft to make one complete revolution during every one of said predetermined periods, whereby said rate-controlling mechanism becomes clock-controlled.

58. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a normally open switch in the motor circuit, an electromagnet for actuating said switch into closed position, a clock-controlled switch for closing the circuit of said electromagnet at the beginning of predetermined periods, means mounted on said shaft for opening the switch in said motor circuit at the end of every revolution of said shaft, transmission-connections between said motor and said shaft for causing the shaft to make one complete revolution during every one of said predetermined periods, whereby said rate-controlling mechanism becomes clock-controlled, and means for decreasing the length of said periods to run said rate-controlling mechanism at higher speed, thereby actuating the connected registers at rates correspondingly higher than the normal rates.

59. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a normally open switch in the motor-circuit, an electromagnet for actuating said switch into closed position, a clock-controlled switch for closing the circuit of said electromagnet at the beginning of predetermined intervals, means mounted on said shaft for opening the switch in said motor-circuit at the end of every revolution of said shaft, transmission-connections between said motor and said shaft for causing the shaft to make one complete revolution during every one of said predetermined periods, whereby said rate-controlling mechanism becomes clock-controlled, a regulating switch in the circuit of said electromagnet, a second regulating switch in the motor-circuit and a connection between said switches for operating them simultaneously to decrease the length of said periods to run said rate-controlling mechanism at higher speed, thereby actuating the connected registers at rates correspondingly higher than the normal rates.

60. In a device of the class described, the combination of a source of electric current, a main circuit connected therewith, a plurality of branch circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a normally open switch in the motor-circuit including a movable arm and a stationary contact, an electromagnet for actuating said arm into closed position, a clock-controlled switch for closing the circuit of said electromagnet at the beginning of predetermined periods, a cam fixed upon said shaft in association with said switch-arm for causing the latter to move into open position at the end of every revolution of said shaft, and transmission-connections between said motor and said shaft for causing the shaft to make one complete revolution during every one of said predetermined periods, whereby said rate-controlling mechanism becomes clock-controlled.

61. In a device of the class described, the combination of a source of electric current, a main circuit connected therewith, a plurality of branch circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a normally open switch in the motor-circuit including a movable arm and a stationary contact, an electromagnet for actuating said arm into closed position, a clock-controlled switch for closing the circuit of said electromagnet at the beginning of predetermined periods, a cam fixed upon said shaft in association with said switch-arm for causing the latter to move into open position at the end of every revolution of said shaft, transmission-connections between said motor and said shaft for causing the shaft to make one complete revolution during every one of said predetermined periods, whereby said rate-controlling mechanism becomes clock-controlled, and means for decreasing the length of said periods to run said rate-controlling mechanism at higher speed, thereby actuating the connected registers at rates correspondingly higher than the normal rates.

62. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a normally open switch in the motor-circuit including a movable arm and a stationary contact, an electromagnet for actuating said arm into closed position, a clock-controlled switch for closing the circuit of said electromagnet at the beginning of predetermined periods; a cam fixed upon said shaft in association with said switch-arm for causing the latter to move into open position at the end of every revolution of said shaft, transmission-connections between said motor and said shaft for causing the shaft to make one complete revolution during every one of said predetermined periods, whereby said rate-controlling mechanism becomes clock-controlled, a regulating switch in the circuit of said electromagnet, a second regulating switch in the motor-circuit, and a connection between said switches for operating them simultaneously to decrease the length of said periods to run said rate-controlling mechanism at higher speed, thereby actuating the connected registers at rates correspondingly higher than the normal rates.

63. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a switch in the motor-circuit including a pivoted arm and a pair of stationary contacts, a resistance between said contacts, means tending to hold said arm in open position, an electromagnet for actuating said arm into engagement with the first of said contacts, whereby the motor-circuit is closed through said resistance, a clock-controlled switch for closing the circuit through said electromagnet at the beginning of predetermined periods and opening said circuit at or before the end of a period, a cam fixed upon said shaft to move said arm into engagement with the second contact as the shaft revolves, whereby the resistance is cut out of the motor-circuit to increase the speed of the motor, said arm being held in its final closed position during one complete revolution of said shaft, a recess provided on said cam for receiving the adjacent portion of said arm at the end of every revolution of the shaft to open the motor-circuit, and transmission-connections between said motor and said shaft for causing the latter to make one complete revolution during every one of said predetermined periods, whereby the actuations of said shaft become clock-controlled.

64. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a switch in the motor-circuit including a pivoted arm and a pair of stationary contacts, a resistance between said contacts, means tending to hold said arm in open position, an electromagnet for actuating said arm into engagement with the first of said contacts whereby the motor-circuit is closed through said resistance, a clock-controlled switch for closing the circuit through said electromagnet at the beginning of predetermined periods and opening said circuit at or before the end of a period, a cam fixed upon said shaft to move said arm into engagement with the second contact as the shaft revolves, whereby the resistance is cut out of the motor-circuit to increase the speed of the motor, said arm being held in its final closed position during one complete revolution of said shaft, a recess provided on said cam for receiving the adjacent portion of said arm at the end of every revolution of the shaft to open the motor-circuit, transmission-connections between said motor and said shaft for causing the latter to make one complete revolution during every one of said predetermined periods, whereby the actuations of said shaft become clock-controlled, and means for decreasing the length of said periods to run said rate-controlling mechanism at higher speed, thereby actuating the connected registers at rates correspondingly higher than the normal rates.

65. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a switch in the motor-circuit including a pivoted arm and a pair of stationary contacts, a resistance between said contacts, means tending to hold said arm in open position, an electromagnet for actuating said arm into engagement with the first of said contacts, whereby the motor-circuit is closed through said resistance, a clock-controlled switch for closing the circuit through said electromagnet at the beginning of predetermined periods and opening said circuit at or before the end of a period, a cam fixed upon said shaft to move said arm into engagement with the second contact as the shaft revolves, whereby the resistance is cut out of the motor-circuit to increase the speed of the motor, said arm being held in its final closed position during one complete revolution of said shaft, a recess provided on said cam for receiving the adjacent portion of said arm at the end of every revolution of the shaft to open the motor-circuit, transmission-connections between said motor and said shaft for causing the latter to make one complete revolution during every one of said predetermined periods, whereby the actuations of said shaft become clock-controlled, a regulating switch in the circuit of said electromagnet, a second regulating switch in the motor-circuit, and a connection between said switches for operating them simultaneously to decrease the length of said periods to run said rate-controlling mechanism at higher speed, thereby actuating the connected registers at rates correspondingly higher than the normal rates.

66. The combination of an electric motor, a power-circuit therefor, a switch in said circuit including a movable arm and a stationary contact, an electromagnet for operating said arm into closed position, a series of clock-controlled switches adapted each to close the circuit of said electromagnet at the end of predetermined periods, the periods of closure being different for the different switches, means fixed upon said shaft for opening the switch in the motor-circuit at the end of every revolution of said shaft, transmission-connections between said shaft and said motor for causing the shaft to make one complete revolution during every one of said predetermined periods, whereby said rate-controlling mechanism becomes clock-controlled, a regulating switch in the circuit of said electromagnet for selecting any one of said clock-controlled switches to control said circuit and thereby vary the length of said period, and a regulating switch in the motor-circuit operable simultaneously with the other regulating switch for varying the resistance in the motor-circuit, so that the motor will revolve said shaft once during every preselected period, irrespective of the length of that period.

67. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, a switch in the motor-circuit including a movable arm and a stationary contact, an electromagnet for operating said arm into closed position, a series of clock-controlled switches adapted each to close the circuit of said electromagnet at the end of predetermined periods, the periods of closure being different for the different switches, means fixed upon said shaft for opening the switch in the motor-circuit at the end of every revolution of said shaft, transmission-connections between said shaft and said motor for causing the shaft to make one complete revolution during every one of said predetermined periods, whereby said rate-controlling mechanism becomes clock-controlled, a regulating switch in the circuit of said electromagnet for selecting any one of said clock-controlled switches to control said circuit and thereby vary the length of said period, and a regulating switch in the motor-circuit operable simultaneously with the other regulating switch for varying the resistance in the motor-circuit, so that the motor will revolve said shaft once during every preselected period, irrespective of the length of that period, whereby the rate-controlling mechanism may be run at higher speeds to actuate the connected registers at rates correspondingly higher than the normal rates.

68. In a device of the class described, the combination of a source of electrical impulses, a plurality of circuits leading therefrom, a register adapted to be included in each circuit to be actuated by the impulses passing therethrough, and clock-governed mechanism for automatically starting and stopping said source at predetermined hours.

69. In a device of the class described, the combination of a source of electrical impulses, a plurality of circuits leading therefrom, a register adapted to be included in each circuit to be actuated by the impulses passing therethrough, rate-controlling mechanism in the register circuits for controlling the rate of actuation of each register, said mechanism being connected with said source of impulses, and clock-governed mechanism for automatically starting and stopping said source of impulses at predetermined hours.

70. In a device of the class described, the combination of a source of electric current, a main circuit connected therewith, a plurality of branch-circuits leading from said main circuit, a switch in said main circuit, means for periodically actuating said switch to cause current impulses to pass through said branch-circuits, a register in each branch-circuit adapted to be actuated by the current-impulses sent therethrough, and clock-governed mechanism for automatically starting and stopping said actuating means at predetermined hours.

71. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, and clock-governed mechanism for automatically starting and stopping said electric motor at predetermined hours.

72. In a device of the class described, the combination of a source of electric current, a main circuit connected therewith, a plurality of branch-circuits leading from said main circuit, a switch in said main circuit, an electric motor for periodically actuating said switch to cause current-impulses to pass through said branch-circuits, a register in each branch-circuit adapted to be actuated one step by every current-impulse sent through the circuit, a selector-mechanism for connecting said registers with said source one after the other, a rate-controlling mechanism in said branch-circuits for controlling the number of impulses passing through each circuit in a predetermined interval of time, a shaft for actuating said rate-controlling mechanism, transmission-connections between said motor and said shaft, means for clock-controlling the operation of said motor, whereby said rate-controlling mechanism becomes clock-controlled, and clock-governed mechanism for automatically starting and stopping said electric motor at predetermined hours.

73. In a device of the class described, the combination of a source of electrical impulses, circuits leading therefrom, an electromagnetically actuated wage-register in each circuit, a plurality of electromagnetically actuated time-registers, one for each wage-register, circuits for said time-registers connected with said source independently of the circuits for the wage-registers, and selector-mechanism for successively connecting said wage-registers one after the other with said source.

74. In a device of the class described, the combination of a source of electrical impulses, a plurality of electromagnetically actuated wage-registers, circuit connections between said source and said wage-registers, a corresponding plurality of electromagnetically actuated time-registers, and circuit connections between said source and said time-registers independent of the circuit connections for the wage-registers.

75. In a device of the class described, the combination of a source of electrical impulses, circuits leading therefrom, an electromagnetically actuated wage-register in each circuit, a plurality of electromagnetically actuated time-registers, one for each wage-register, circuits for said time-registers connected with said source independently of the circuits for the wage-registers, selector-mechanism for successively connecting said wage-registers one after the other with said source, and a corresponding plurality of workman's switches, one for each wage-register, adapted to control the circuits of the associated wage-registers and time-registers simultaneously by a single operation.

76. In a device of the class described, the combination of a plurality of wage-registers, a plurality of time-registers, actuating mechanism for all of said registers, and connections between said mechanism and said registers for actuating said wage-registers successively and said time-registers concurrently.

77. In a device of the class described, the combination of a source of electrical impulses, circuits leading therefrom, an electromagnetically actuated wage-register in each circuit, selector-mechanism for connecting said registers with said source one after the other, a plurality of time-registers, one for each wage-register, and circuit connections between said time-registers and said source independent of the circuits for the wage-registers, such that the connected-in time-registers are actuated concurrently.

78. In a device of the class described, the combination of a plurality of electromagnetically actuated wage-registers, a corresponding plurality of electromagnetically actuated time-registers, energizing circuits for said registers, and means for sending current-impulses through said circuits to actuate the wage-registers successively but the time-registers concurrently.

79. In a device of the class described, the the combination of a source of current, a plurality of electromagnetically actuated wage-registers, energizing circuits therefor connected with said source, a periodically actuated switch for sending current-impulses through said circuits, a plurality of electromagnetically actuated time-registers, energizing circuits therefor connected with said source independently of the circuits of said wage-registers, a periodically actuated switch for sending current-impulses through the circuits of the time-registers, and time-controlled mechanism for actuating said switches.

80. In a device of the class described, the combination of a source of current, a plurality of electromagnetically actuated wage-registers, energizing circuits therefor connected with said source, a periodically actuated switch for sending current-impulses through said circuits, selector-mechanism for connecting said wage-registers with said source one after the other, whereby the wage-registers are actuated successively, a plurality of electromagnetically actuated time-registers, energizing circuits therefor connected with said source independently of the circuits of said wage-registers, a periodically actuated switch for sending current impulses through the circuits of the time-registers to actuate the same concurrently, and time-controlled mechanism for actuating said switch.

81. In a device of the class described, the combination of a source of electrical impulses, a plurality of electromagnetically actuated registers, energizing circuits therefor connected with said source, a cyclically operating rate-controlling mechanism in said circuits for controlling the rate of actuation of each register, and means for varying the cycle of operation of said mechanism to vary simultaneously the rates of actuation of all of the registers.

82. In a device of the class described, the combination of a source of electrical impulses, a plurality of electromagnetically actuated registers, energizing circuits therefor connected with said source, a cyclically operating rate-controlling mechanism in said circuits for controlling the rate of actuation of each register, means for varying the cycle of operation of said mechanism to vary simultaneously the rates of actuation of all of the registers, and additional means for varying the rate of actuation of any register independently of any other register.

83. In a device of the class described, the combination of a plurality of individual wage-registers, a plurality of individual job-registers, a source of electrical impulses, energizing circuits connected with said source for actuating said registers, a job-total register, a wage-total register, circuit connections for causing the totalizing-registers to indicate the sum of the actuations of the individual job-registers and wage-registers respectively, a total-cost register included in the circuit of said totalizing registers, and means for entering into said total-cost register any desired amount without affecting said job-total and wage-total registers.

84. In a device of the class described, the combination of a source of electrical impulses, a plurality of registers adapted each to be connected with said source to be actuated by said impulses, a second source of electrical impulses, and means for connecting any register with said second source to actuate the same forwardly an amount sufficient to bring the register to zero.

85. In a device of the class described, the combination of a source of electrical impulses, a plurality of registers adapted each to be connected with said source to be actuated forwardly by said impulses, a second source of electrical impulses, means for connecting any register with said second source to actuate the same forwardly, and a keyboard for controlling the number of impulses sent through any one register from said second source to bring the register to zero.

86. In a device of the class described, the combination of a plurality of electromagnetically actuated registers, time-controlled mechanism for actuating said registers one after the other, a resetting device, and means for connecting any register with said resetting device to actuate the register forwardly to zero.

87. In a device of the class described, the combination of a plurality of electromagnetically actuated registers, time-controlled mechanism for actuating said registers one after the other, a resetting device including a keyboard for controlling the operation thereof, and means for connecting any register with said resetting device to actuate the register forwardly to zero.

88. In a device of the class described, the combination of a source of electrical impulses, a plurality of registers, means for connecting any register at will with said source for actuation, a spring-jack associated with each register, a source of current, a circuit connected therewith, a plug in said circuit adapted to be inserted in said spring-jack, a switching device for periodically closing the circuit through any register by way of the associated spring-jack and coöperating plug, and keyboard mechanism for controlling the operation of said switching device.

89. In a device of the class described, the combination of an electric circuit, means for sending current impulses therethrough, a totalizing-register in said circuit adapted to be actuated forwardly by the current-impulses passing through the circuit, a second totalizing-register adapted to be actuated reversely by said current-impulses, said registers being actuated simultaneously, mechanism for automatically controlling the current-impulses so that the amount of forward actuation of said first-mentioned register will bring the same to zero, and automatic means for advancing one step the numeral-wheel of said second register which is one order higher than the highest-order numeral-wheel of said first-mentioned register.

90. The combination of a pair of registers, actuating mechanism therefor, connections between said registers and said mechanism such that one of said registers is actuated forwardly while the other register is actuated reversely an equal amount, means for automatically rendering said mechanism inoperative when said forwardly actuated register has been brought to zero, and automatic means for advancing one step the numeral-wheel of said other register which is one order higher than the highest-order numeral-wheel of the forwardly actuated register.

91. In a device of the class described, the combination of a plurality of individual registers adapted to receive entries, a totalizing-register, an actuating mechanism for said register, means for connecting said individual registers one after the other with said mechanism to enter into the connected register an amount equal to the complement of the entry of that register, said connecting means causing the totalizing-register to be actuated concurrently with each individual register in a reverse direction, so that the amount entered into each individual register to bring the same to zero is subtracted from the totalizing-register, and automatic means for advancing one step for each register cleared the numeral-wheel of the totalizing-register which is one order higher than the highest-order numeral-wheel of the cleared register.

92. The combination of a source of current-impulses, a plurality of individual registers adapted to receive entries, means for connecting said registers with said source one at a time to be actuated forwardly, a totalizing-register adapted to be actuated concurrently with each individual register in a reverse direction, controlling mechanism for sending into any connected individual register a number of impulses equal to the complement of the entry of that register, said number of impulses subtracting that complement from the totalizing-register, and automatic means for sending an extra impulse for each register cleared into the totalizing-register to advance one step the numeral-wheel of the totalizing-register which is one order higher than the highest-order numeral-wheel of the cleared register.

93. In a device of the class described, the combination of an electromagnetically actuated register adapted to receive an entry, mechanism for sending into said register a number of current-impulses equal to the complement of said entry to actuate the register forwardly to zero, and means for automatically preventing actuation of the register beyond zero.

94. In a device of the class described, the combination of an electromagnetically actuated register adapted to receive an entry, a second electromatically actuated register, mechanism for sending into said first-mentioned register a number of current-impulses equal to the complement of said entry to actuate the register forwardly to zero and at the same time sending the same number of impulses into the totalizing-register to actuate the same reversely, so that the amount entered into said first mentioned register to bring the same to zero is subtracted from said second register, and automatic means for sending an extra impulse for each register cleared into said second register to actuate one step the numeral-wheel of said second register which is one order higher than the highest-order numeral-wheel of said first mentioned register.

95. In a device of the class described, the combination of a register, time-controlled mechanism for actuating the same at a predetermined rate, and key-board mechanism operated only by means other than said time-controlled mechanism for making any desired entry in said register.

96. In a device of the class described, the combination with an electromagnetically actuated register, of mechanism when set for a desired amount for actuating said register forwardly the complement of said amount to subtract said amount from the reading of the register.

97. The combination of an electromagnetically actuated register, a source of current-impulses, connections between said register and said source, impulse-sending mechanism and a keyboard mechanism for controlling the operation of the impulse-sending mechanism to regulate the number of impulses passing into the register.

98. The combination of an electromagnetically actuated register, a source of current-impulses, impulse-sending mechanism and key-controlled means for limiting the operation of the impulse-sending mechanism.

99. In a device of the class described, the combination of an individual register adapted to receive an entry, a spring-jack associated with said register, a pair of totalizing-registers, a second spring-jack, connections between said second spring-jack and said totalizing-registers, a source of current-impulses for actuating all of said registers, a pair of plugs arranged to be inserted in said jacks for connecting the registers with said source, and manually controlled mechanism for predetermining the amount of actuation of said registers to clear said individual register of its entry, the connections between such source of impulses and all of said registers being such that the amount of the entry cleared from the individual register is automatically added into one of said totalizing-registers and subtracted out of the other totalizing-register.

100. In a device of the class described, the combination of an individual register adapted to receive an entry, a spring-jack associated with said register, a pair if totalizing-registers, a second spring-jack, connections between said second spring-jack and said totalizing-registers, a source of current-impulses for actuating all of said registers, a pair of plugs arranged to be inserted in said jacks for connecting said registers with said source, impulse-controlling mechanism including a keyboard for setting up the complement of the entry in said individual register and thereby predetermining the number of impulses passing through the registers to actuate said individual register an amount sufficient to set the register forward to zero, the connections between said source of impulses and all of said registers being such that said complement is subtracted out of one of said totalizing-registers and added to the other totalizing-register, and automatic means for advancing one step the numeral-wheel of each totalizing-register which is one order higher than the highest-order numeral-wheel of said individual register, whereby the entry cleared from the individual register is added into the totalizing-register from which the complement was subtracted and is subtracted from the totalizing-register into which the complement was added.

101. In a device of the class described, the combination of a register adapted to receive an entry, a spring-jack associated with said register, a second register having a spring-jack associated therewith, a source of current-impulses for actuating said registers, a pair of plugs arranged to be inserted in said jacks for connecting the registers with said source, and manually controlled mechanism for predetermining the amount of actuation of said registers to clear the first register of its entry, the connections between said source of impulses and said registers being such that the amount of the entry cleared from the first register is automatically added into said second register.

102. In a device of the class described, the combination of a register adapted to receive an entry, a spring-jack associated with said register, a second register having a spring-jack associated therewith, a source of current-impulses for actuating said registers, a pair of plugs arranged to be inserted in said jacks for connecting the registers with said source, impulse-controlling mechanism including a keyboard for setting up the complement of the entry in said first-mentioned register and thereby predetermining the number of impulses passing through the registers to actuate said first-mentioned register an amount sufficient to set the register forward to zero, the connections between said source of impulses and said registers being such that said complement is subtracted out of said second register, and automatic means for advancing one step the numeral-wheel of said second register which is one order higher than the highest-order numeral-wheel of said first register, whereby the entry cleared from said first register is added into said second register.

103. In a system of the class described, the combination of a pair of waste-wage registers. means for actuating the same concurrently, a third waste-wage register, and means for clearing one of said first-mentioned waste-wage registers into said third waste-wage register.

104. In a system of the class described, the combination of a plurality of separate registers, means for actuating the same concurrently, and mechanism for predetermining the amount of forward actuation of said registers to subtract out of the same any desired amount.

105. In a system of the class described, the combination of a plurality of separate registers, means for actuating the same concurrently, and key-controlled mechanism for predetermining the amount of forward actuation of said registers to subtract out of the same any desired amount.

106. The combination of a register, a source of current-impulses for actuating the same, impulse-sending mechanism and key-controlled mechanism for limiting the operation of the impulse-sending mechanism to determine the number of impulses passing into said register to subtract out of the same any desired amount.

107. In a device of the class described, the combination of a plurality of registers, spring-jacks associated therewith, a source of current-impulses for actuating said registers. plugs arranged to be inserted in said jacks for connecting the registers with said source, and key-controlled mechanism for regulating the degree of actuation of said registers to subtract out of the registers any desired amount.

108. In a device of the class described, the combination of a plurality of registers, a source of current-impulses, a plurality of plugs connected with said source to establish operative connection between said source of impulses and said registers, and key-controlled mechanism for predetermining the amount of actuation of the connected registers.

109. The combination of an electromagnet, an energizing circuit therefor, a clock adapted to periodically close said circuit, a rheostat arranged to be operated by said electromagnet upon closure of said circuit, a power-shaft, and means associated therewith for actuating said rheostat once during every revolution of said shaft.

110. The combination of a power-supplying member adapted to continuous rotation, an impulse-making mechanism operated thereby, and clock-governed mechanism for automatically starting and stopping said power-supplying member at given times.

111. The combination of a register, means for actuating the same in one direction, and auxiliary means for actuating one of the numeral-wheels in a reverse direction.

112. The combination of a register, electromagnetic means for electrically actuating the same in one direction, and auxiliary electromagnetic means for actuating one of the numeral-wheels in a reverse direction.

113. The combination of a register, a pair of separate actuating mechanisms associated therewith, a differential gear-connection between said register and said mechanisms, and auxiliary mechanism for actuating one of the numeral-wheels in a direction reverse to that in which the register is actuated by said first-mentioned mechanism.

114. The combination of a register, a pair of electromagnets associated therewith for actuating the same forwardly, differential gear-connections between said register and said electromagnets, and an auxiliary electromagnet for actuating one of the numeral-wheels in a reverse direction.

115. In a device of the class described, the combination of a plurality of individual time-registers, means for actuating the same concurrently in a forward direction, mechanism for clearing said registers successively one at a time, and a summation-register connected with said mechanism for automatically totalizing the entries as they are cleared.

116. In a device of the class described, the combination of a plurality of individual registers, a source of current-impulses for actuating said registers. key - controlled mechanism for controlling the number of impulses passing into the registers so as to clear the same, and a totalizing-register controlled by said mechanism for automatically totalizing the entries cleared out of the individual registers.

117. In a device of the class described, the combination of a plurality of individual time-registers, means for actuating the same concurrently in a forward direction, mechanism for actuating the registers forwardly to zero, and a summation-register controlled by said mechanism for automatically totalizing the entries as they are cleared.

118. In a mechanism of the class described, the combination with a plurality of numeral-wheels, of a setting bar associated with each numeral-wheel for actuating the same in a reverse direction independently of the other numeral-wheels, a common actuating means for all of the setting bars, and a yieldable connection between each setting bar and said common means.

119. In a mechanism of the class described, the combination with a plurality of numeral-wheels, of a setting bar associated with each numeral-wheel for actuating the same in a reverse direction independently of the other numeral-wheels, a common actuating means for all of the setting bars, a yieldable connection between each setting bar and said common means, and resilient means associated with each setting bar for retracting the same to its initial position upon release.

120. In a mechanism of the class described, the combination of a shaft, a source of power for driving said shaft, a plurality of disks, differential connections between said disks and said shaft for actuating said disks independently of each other, key-controlled means for predetermining the amount of actuation of each disk by said shaft, and means for automatically stopping said shaft after the predetermined amount of actuation of said disks.

121. In a mechanism of the class described, the combination of a plurality of disks, means for actuating the same independently of each other a predetermined amount, a shaft, differential connections between said disks and said shaft for further actuation of the disks in the same direction to return the same to initial position, and means for automatically stopping said shaft when all of said disks have been returned to initial position.

122. In a mechanism of the class described, the combination of a plurality of disks, means for actuating the same independently of each other, a keyboard for controlling the operation of said actuating means to predetermine the amount of actuation of each disk, a shaft, differential connections between said disks and said shaft for further actuation of the disks in the same direction to return the same to initial position, and means for automatically stopping said shaft when all of said disks have been returned to initial position.

123. In a mechanism of the class described, the combination of a plurality of disks, a setting bar associated with each disk for actuating the same independently of the other disks, a keyboard for controlling the operation of the setting bars to predetermine the amount of actuation of each disk, a shaft, differential connections between said disks and said shaft for further actuation of the disks in the same direction to return the same to initial position, and means for automatically stopping said shaft when all of said disks have been returned to initial position.

124. In a mechanism of the class described, the combination of a plurality of disks, a setting bar associated with each disk for actuating the same independently of the other disks, a common actuating means for simultaneously operating said setting bars independently of each other, a keyboard for controlling the operation of the setting bars to predetermine the amount of actuation of each disk, a shaft, differential connections between said disks and said shaft for further actuation of the disks in the same direction to return the same to initial position, and means for automatically stopping said shaft when all of said disks have been returned to initial position.

125. In a mechanism of the class described, the combination of a plurality of disks, means for actuating the same independently of each other a predetermined amount, a shaft, differential connections between said disks and said shaft for further actuation of the disks in the same direction to return the same to initial position, a source of current, an electromagnetically actuated register, circuit-connections between said source and said register, a switch included in said connections and controlled by said shaft, and means for automatically stopping said shaft when all of said disks have been returned to initial position.

126. In a mechanism of the class described, the combination of a plurality of disks, means for actuating the same independently of each other, a keyboard for controlling the operation of said actuating means to predetermine the amount of actuation of each disk, a shaft, differential connections between said disks and said shaft for actuation of the disks in the same direction to return the same to initial position, a source of current, an electromagnetically actuated register, circuit-connections between said source and said register, a switch included in said connections and controlled by said shaft, and means for automatically stopping said shaft when all of said disks have been returned to initial position.

127. In a mechanism of the class described, the combination of a plurality of disks, a setting bar associated with each disk for actuating the same independently of the other disks, a keyboard for controlling the operation of the setting bars to predetermine the amount of actuation of each disk, a shaft, differential connections between said disks and said shaft for further actuation of the disks in the same direction to return the same to initial position, a source of current, an electromagnetically actuated register, circuit-connections between said source and said register, a switch included in said connections and controlled by said shaft, and means for automatically stopping said shaft when all of said disks have been returned to initial position.

128. In a mechanism of the class described, the combination of a plurality of disks, a keyboard provided with decimally ordered rows of numeral-keys, there being a row for each disk, a setting bar controlled by each row of keys for actuating the associated disk an amount complemental to the number represented by the depressed key of that row, a shaft, differential connections between said disks and said shaft for further actuation of the disks in the same direction to return the same to initial position, the gear-ratios between said shaft and said disks being such that the number of revolutions of said shaft required to advance one step a higher-order disk is ten times that required for the disk of the next lower order, a source of current, an electromagnetically actuated register, circuit-connections between said source and said register, a switch included in said connections and controlled by said shaft for sending current-impulses into the register, and means for automatically stopping said shaft when all of said disks have been returned to initial position.

129. In a mechanism of the class described, the combination of a plurality of disks, a keyboard provided with decimally ordered rows of numeral-keys, there being a row for each disk, a setting bar controlled by each row of keys for actuating the associated disk an amount complemental to the number represented by the depressed key of that row, a shaft, differential connections between said disks and said shaft for further actuation of the disks in the same direction to return the same to initial position, the gear-ratios between said shaft and said disks being such that one revolution of said shaft advances the lowest-order disk one space, while the number of revolutions required to advance one space a higher-order disk is ten times that required for the next lower-order disk, a source of current, an electro-magnetically actuated register, circuit-connections between said source and said register, a switch included in said connections and controlled by said shaft for sending current-impulses into the register, said switch being closed once during every revolution of said shaft, and means for automatically stopping said shaft when all of said disks have been returned to initial position, whereby the number of impulses sent into the register equals the number set up on the key-board.

130. In a mechanism of the class described, the combination of a plurality of disks, means for actuating the same independently of each other, a keyboard for controlling the operation of said actuating means to predetermine the amount of actuation of each disk, a shaft, a source of power for driving said shaft, a normally inoperative connection between said shaft and said source of power, a locking and releasing mechanism for making and breaking said connection, a key for actuating said mechanism to connect the shaft with said source of power for continuous rotation, differential connections between said disks and said shaft for further actuation of the disks in the same direction to return the same to initial position, and means for automatically actuating said mechanism to disconnect said shaft from said source of power upon return of all of said disks to initial position.

131. In a mechanism of the class described, the combination of a plurality of disks, a setting bar associated with each disk for actuating the same independently of the other disks, a keyboard for controlling the operation of the setting bars to predetermine the amount of actuation of each disk, a shaft, a source of power for driving said shaft, a normally inoperative connection between said shaft and said source of power, a locking and releasing mechanism for making and breaking said connection, a key for actuating said mechanism to connect the shaft with said source of power for continuous rotation, differential connections between said disks and said shaft for further actuation of the disks in the same direction to return the same to initial position, and means for automatically actuating said mechanism to disconnect said shaft from said source of power upon return of all of said disks to initial position.

132. In a mechanism of the class described, the combination of a plurality of disks, means for actuating the same independently of each other, a keyboard for controlling the operation of said actuating means to predetermine the amount of actuation of each disk, a shaft, a source of power for driving said shaft, a normally inoperative connection between said shaft and said source of power, a locking and releasing mechanism for making and breaking said connection, a key for actuating said mechanism to connect the shaft with said source of power for continuous rotation, differential connections between said disks and said shaft for further actuation of the disks in the same direction to return the same to initial position, a source of current, an electromagnetically actuated register, circuit-connections between said source and said register, a switch included in said connections and controlled by said shaft, and means for automatically actuating said mechanism to disconnect said shaft from said source of power upon return of all of said disks to initial position.

133. In a mechanism of the class described, the combination of a plurality of disks, a keyboard provided with decimally ordered rows of numeral-keys, there being a row for each disk, a setting bar controlled by each row of keys for actuating the associated disk an amount complemental to the number represented by the depressed key of that row, a shaft, a source of power for driving said shaft, a normally inoperative connection between said shaft and said source of power, a locking and releasing mechanism for making and breaking said connection, a key for actuating said mechanism to connect the shaft with said source of power for continuous rotation, differential connections between said disks and said shaft for further actuation of the disks in the same direction to return the same to initial position, the gear-ratios between said shaft and said disks being such that the number of revolutions of said shaft required to advance one space a higher-order disk is ten times that required for the disk of the next lower order, a source of current, an electromagnetically actuated register, circuit connections between said source and said register, a switch included in said connections and controlled by said shaft for sending current impulses into the register, and means for automatically actuating said mechanism to disconnect said shaft from said source of power upon return of all of said disks to initial position.

134. In a mechanism of the class described, the combination of a plurality of disks, a keyboard provided with decimally ordered rows of numeral-keys, there being a row for each disk, a setting bar controlled by each row of keys for actuating the associated disk an amount complemental to the number represented by the depressed key of that row, a shaft, a source of power for driving said shaft, a normally inoperative connection between said shaft and said source of power, a locking and releasing mechanism for making and breaking said connection, a key for actuating said mechanism to connect the shaft with said source of power for continuous rotation, differential connections between said disks and said shaft for further actuation of the disks in the same direction to return the same to initial position, the gear-ratios between said shaft and said disks being such that one revolution of said shaft advances the lowest-order disk one space, while the number of revolutions required to advance one space a higher-order disk is ten times that required for the next lower order disk, a source of current, an electromagnetically actuated register, circuit connections between said source and said register, a switch included in said connections and controlled by said shaft for sending current impulses into the register, said switch being closed once during every revolution of said shaft, and means for automatically actuating said mechanism to disconnect said shaft from said source of power upon return of all of said disks to initial position, whereby the number of impulses sent into the register equals the number set up on the keyboard.

135. In a device of the class described, the combination of a register, time-controlled mechanism for actuating the same, and separate manually controlled mechanism for actuating said register forwardly to zero at a higher speed than it is actuated by said time-controlled mechanism.

136. In a mechanism of the class described, the combination of a plurality of disks, a keyboard provided with rows of depressible numeral keys, there being a row for each disk, a setting bar controlled by each row of keys for actuating the associated disk an amount corresponding to the complement of the number represented by the depressed key of that row, a register, means for actuating the same, and connections whereby said disks so control the operation of said actuating means that the register is actuated an amount corresponding to the amount set up on the keyboard.

137. In a mechanism of the class described, the combination of a keyboard, a plurality of disks, connections between said disks and keyboard for actuating said disks an amount corresponding to the complement of the amount set up on the keyboard, a register, means for actuating the same, and connections between said disks and said actuating means for automatically causing said register to be actuated an amount corresponding to the amount set up on the keyboard.

138. In a mechanism of the class described, the combination of a plurality of numeral-wheels, differential gears associated therewith having a plurality of ratios, and means for actuating said numeral-wheels through said said gears at a desired ratio.

139. In a mechanism of the class described, the combination of a plurality of disks, multi-ratio differential gears associated therewith, means for actuating said disks through said multi-ratio gears, and a register controlled by said actuating means.

140. In a mechanism of the class described, the combination of a keyboard, a plurality of disks, connections between said disks and said keyboard for actuating said disks an amount corresponding to the complement of the amount set up on the keyboard, a shaft, means for actuating said shaft, a register controlled by said shaft, and multi-ratio connections between said shaft and said disks, whereby the latter so control the operation of said shaft that the register is actuated an amount corresponding to the amount set up on the keyboard.

141. In a mechanism of the class described, the combination of a keyboard, a plurality of disks, connections between said disks and said keyboard for actuating said disks an amount dependent upon the amount set up on the keyboard, a register, means for actuating the same, and connections between said disks and said actuating means for automatically causing said register to be actuated an amount corresponding to the amount set up on the keyboard.

142. In a mechanism of the class described, the combination of a plurality of disks, multi-ratio differential gears associated therewith, means for actuating said disks independently of said multi-ratio gears, and means for actuating said disks through said multi-ratio gears, the operation of said actuating means being controlled by said disks.

143. In a mechanism of the class described, the combination of a plurality of disks, multi-ratio differential gears associated therewith, means for actuating said disks independently of said multi-ratio gears, a shaft for actuating said disks through said multi-ratio gears, the operation of said shaft being controlled by said disks, and a register controlled by said shaft.

144. The combination of workmen's individual electromagnetic wage registers, automatically actuated switching mechanism for connecting said registers successively in circuit, and a second switching mechanism serving automatically to send a current impulse through the individual circuit associated with each register during a certain predetermined closure of each individual circuit by the said first switching mechanism.

145. In a device of the class described, the combination of a plurality of workmen's individual registers, automatically actuated means for successively establishing operative connections for the operation of said registers, and means serving automatically to actuate each register during a portion only of the connections thus operatively established.

146. In combination, a register, automatically actuated means for periodically establishing operative connections for the actuation of said register, and means serving to actuate said register during only a portion of said connections.

147. In combination, a plurality of registers, a totalizing register, and devices for totalizing the indications of said registers in the totalizing register by moving the totalizing register against the progression of its digits.

148. In combination, a plurality of registers, means for operating each of said registers, a totalizing register, and mechanism for clearing each register into said totalizing register by operating said register in a forward direction an amount equal to the complement of its indication and simultaneously operating the totalizing register an equal amount in a direction against the progression of the digits of said totalizing register.

149. In combination, a plurality of register circuits, a source of current, a selector for successively connecting said register circuits with said source of current, contact mechanism for connecting said source of current with said selector but once at the time that it is connected with each register circuit, and rate mechanism for determining the number of effective circuit closures made by said selector with any of said register circuits during a cycle of operation of said selector.

150. In combination, a plurality of register circuits, a source of current, a selector for successively connecting said register circuits with said source of current, contact mechanism for connecting said source of current with said selector but once at the time that it is connected with each register circuit, and rate mechanism for rendering ineffective certain of the circuit closures made by said selector.

151. In combination, a plurality of register circuits, rate mechanism supplying electric impulses at a plurality of rates, and a cross connecting board for establishing connection between any desired part of said rate mechanism and a desired one of said register circuits.

152. In combination, a plurality of register circuits, and rate mechanism having terminals for delivering electric impulses at different rates, a main cross connecting board for connecting any one of said terminals with a desired one of said register circuits, an auxiliary cross connecting board having connections of different rate value associated with the connections of the main connecting board, and devices for connecting by means of either connecting board any desired terminal with any one of the register circuits.

153. In combination, a register circuit, mechanism for sending current impulses through said circuit, and a key board mechanism for controlling the impulses thus sent, said key board mechanism comprising a plurality of keys, members operated by said keys, and differential gearing between said members, the operation of one of said members serving to permit actuation of the differential gearing corresponding to the value of the actuated key, whereby the impulse sending mechanism will send through the register circuit a number of current impulses corresponding to the units of value of the key actuated.

154. In an accounting system, a key board mechanism for determining the number of electric impulses used to actuate registering mechanism comprising contact mechanism, a driving device, a series train of gearing for determining the amount of actuation of the contact device, and keys adapted when actuated to permit motion of said gearing at different points in said train, whereby the total number of impulses sent by the contact mechanism for any set up of the key board is equal in value to the number of units of said set up.

In witness whereof I have hereunto subscribed my name this 29th day of March, A. D. 1909.

FREDERICK O. HEUSER.

Witnesses:
LYNN A. WILLIAMS,
C. H. TALLMADGE.